United States Patent
Park et al.

(10) Patent No.: US 9,086,587 B2
(45) Date of Patent: Jul. 21, 2015

(54) LIQUID CRYSTAL DISPLAY AND MANUFACTURING METHOD THEREOF

(71) Applicant: Samsung Display Co., Ltd., Yongin (KR)

(72) Inventors: Gyung-Soon Park, Seoul (KR); Il Gon Kim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 127 days.

(21) Appl. No.: 13/828,385

(22) Filed: Mar. 14, 2013

(65) Prior Publication Data

US 2014/0118673 A1 May 1, 2014

(30) Foreign Application Priority Data

Nov. 1, 2012 (KR) .................. 10-2012-0123210

(51) Int. Cl.
| | |
|---|---|
| *G02F 1/1333* | (2006.01) |
| *G02F 1/1339* | (2006.01) |
| *G02F 1/1343* | (2006.01) |
| *G02F 1/1362* | (2006.01) |

(52) U.S. Cl.
CPC ...... *G02F 1/133345* (2013.01); *G02F 1/13394* (2013.01); *G02F 1/134363* (2013.01); *G02F 1/136209* (2013.01); *G02F 2001/134372* (2013.01); *G02F 2201/40* (2013.01)

(58) Field of Classification Search
CPC .............................................. G02F 1/133345
USPC ....................................................... 349/138
See application file for complete search history.

(56) References Cited

U.S. PATENT DOCUMENTS

| | | | |
|---|---|---|---|
| 5,877,832 A * | 3/1999 | Shimada ........................ | 349/138 |
| 6,933,528 B2 | 8/2005 | Itakura et al. | |
| 2001/0010567 A1* | 8/2001 | Rho et al. ........................ | 349/43 |
| 2002/0063824 A1* | 5/2002 | Ha et al. ........................ | 349/113 |
| 2004/0109101 A1* | 6/2004 | Kim et al. ....................... | 349/44 |
| 2006/0145161 A1* | 7/2006 | Lee et al. ........................ | 257/72 |
| 2009/0185094 A1* | 7/2009 | Lee et al. ........................ | 349/46 |
| 2010/0155719 A1 | 6/2010 | Sakata et al. | |
| 2012/0038874 A1* | 2/2012 | Kim et al. ...................... | 349/138 |

FOREIGN PATENT DOCUMENTS

| | | |
|---|---|---|
| JP | 2002-184999 | 6/2002 |
| JP | 2009-192672 | 8/2009 |
| KR | 10-0386861 | 5/2003 |

(Continued)

*Primary Examiner* — Dennis Y Kim
(74) *Attorney, Agent, or Firm* — H.C. Park & Associates, PLC

(57) ABSTRACT

In a liquid crystal display (LCD), a thickness of a passivation layer overlapping signal lines is larger than a thickness of portion of the passivation layer not overlapping signal lines. A spacer may be formed to overlap the signal lines. In an aperture region of the LCD, a thickness of the passivation layer between a common electrode and a pixel electrode is relatively small, and therefore, it may be possible to prevent reduction in the intensity of the electric field between the common electrode and the pixel electrode. Since thickness of the passivation layer may be relatively large, it may be possible to prevent a signal delay of common voltage. A spacer may be formed overlapping signal lines with relatively thick passivation layer. The spacer may have a small height. Cell gap may be adjusted to be uniform, and prevent reduction in aperture ratio of the LCD.

5 Claims, 28 Drawing Sheets

(56) References Cited

FOREIGN PATENT DOCUMENTS

| KR | 10-0443538 | 7/2004 |
| KR | 10-2007-0097262 | 10/2007 |
| KR | 10-0862926 | 10/2008 |
| KR | 10-0983579 | 9/2010 |
| KR | 10-2011-0067369 | 6/2011 |
| KR | 10-2011-0072132 | 6/2011 |
| KR | 10-1107691 | 1/2012 |

* cited by examiner

LIQUID CRYSTAL DISPLAY AND MANUFACTURING METHOD THEREOF

CROSS REFERENCE TO RELATED APPLICATION

This application claims priority from and the benefit of Korean Patent Application No. 10-2012-0123210, filed on Nov. 1, 2012, which is hereby incorporated by reference for all purposes as if fully set forth herein.

BACKGROUND OF THE INVENTION

1. Field of the Invention

Exemplary embodiments of the present invention relate to a liquid crystal display and a manufacturing method the liquid crystal display.

2. Discussion of the Background

A liquid crystal display, which is one of the most common types of flat panel displays currently in use, is a display device that applies voltage to an electrode to rearrange liquid crystal molecules in a liquid crystal layer so that the amount of light transmitted may be adjusted.

The liquid crystal display has an advantage of having relatively small thickness, but has a drawback in that side visibility is lower compared with front visibility. In order to overcome the drawback, various types of liquid crystal arrangement and driving methods are being developed. As a means for implementing a wide viewing angle, a liquid crystal display in which a pixel electrode and a common electrode are formed on a single substrate has attracted attention.

Since common electrodes receive common voltage while being connected to each other across a plurality of pixel areas of a liquid crystal display, a signal delay may occur. When the common electrode is disposed on a data line, a signal delay of common voltage applied to the common electrode may be caused by electromagnetic interference due to data voltage being applied to the data line. When the signal delay of common voltage occurs, it is difficult to display a desired gray at each pixel, and the display quality deteriorates. Additionally, when a thickness of an insulating layer disposed beneath the common electrode is increased, electromagnetic interference of data voltage applied to the data line may be reduced. However, the intensity of an electric field between the common electrode and a pixel electrode overlapping the common electrode decreases, and data voltage required to drive liquid crystal molecules increases.

An upper panel and a lower panel of the liquid crystal display are supported by a spacer disposed between the two panels to maintain a cell gap. In order to prevent light leakage from occurring due to the spacer, the spacer is covered with an opaque member. Additionally, the higher the spacer is, the wider the spacer is. As the height of the spacer is increased, an aperture ratio of the liquid crystal display is reduced by the opaque member for covering the spacer.

The above information disclosed in this section is only for enhancement of understanding of the background of the invention and the information disclosed may contain information that does not form the prior art that is already known in this country to a person of ordinary skill in the art.

SUMMARY OF THE INVENTION

Exemplary embodiments of the invention provide a liquid crystal display having advantages of preventing a signal delay of common voltage along signal lines such as data lines, preventing the intensity of an electric field between a common electrode and a pixel electrode from being reduced, and preventing a reduction in an aperture ratio of the liquid crystal display while adjusting a cell gap between an upper substrate and a lower substrate to be uniform.

Additional features of the invention will be set forth in the description which follows, and in part will be apparent from the description, or may be learned by practice of the invention.

Exemplary embodiments of the present invention provide a liquid crystal display, including a first substrate, a first electrode and a second electrode disposed on the first substrate, the first electrode overlapping the second electrode, an insulating layer disposed between the first electrode and the second electrode, and a first signal line and a second signal line disposed on the first substrate, the first signal line and the second signal line being connected to the first electrode, wherein the insulating layer comprises a passivation layer disposed between the second signal line and the second electrode, wherein the passivation layer comprises a first portion overlapping the first signal line and the second signal line and a second portion not overlapping the first signal line and the second signal line, and wherein a thickness of the first portion is larger than a thickness of the second portion.

Exemplary embodiments of the present invention also provide a method of manufacturing a liquid crystal display, including forming a first signal line and a second signal line on a first substrate, forming a passivation layer on the first signal line and the second signal line, forming a photosensitive film on the passivation layer, exposing the photosensitive film using the first signal line and the second signal line as a photomask, forming a photosensitive film pattern by printing the exposed photosensitive film, forming a passivation layer having a first portion and a second portion by etching a part of the passivation layer using the photosensitive film pattern as an etching mask, the first portion having a first thickness and the second portion having a second thickness smaller than the first thickness, and forming a first electrode on the passivation layer.

It is to be understood that both the foregoing general description and the following detailed description are exemplary and explanatory and are intended to provide further explanation of the invention as claimed.

BRIEF DESCRIPTION OF THE ILLUSTRATED EMBODIMENTS

The accompanying drawings, which are included to provide a further understanding of the invention and are incorporated in and constitute a part of this specification, illustrate exemplary embodiments of the invention, and together with the description serve to explain the principles of the invention.

Figure 8:
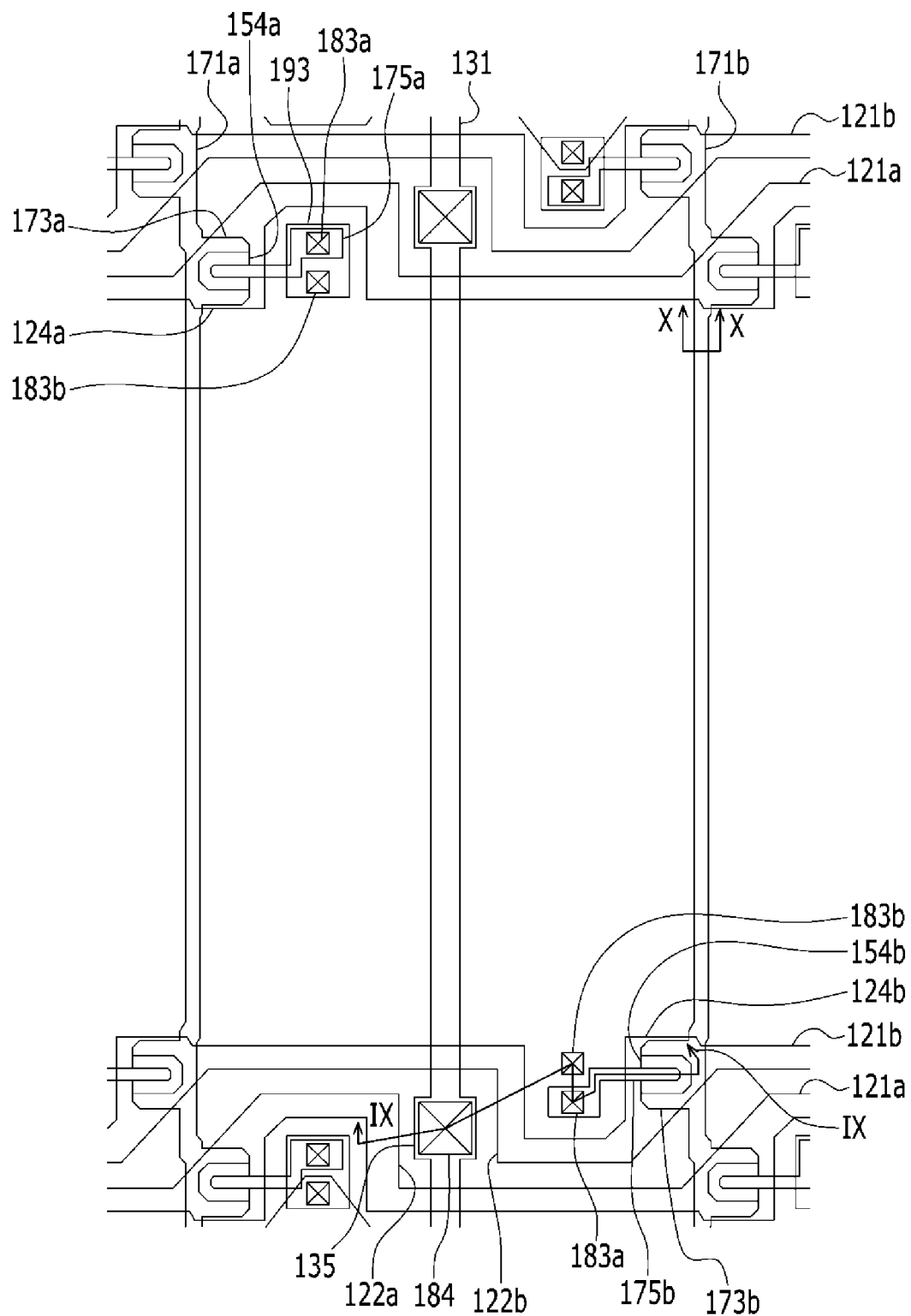

FIG. 11, FIG. 13, FIG. 15, and FIG. 17 are cross-sectional views taken along line IX-IX showing the liquid crystal display of FIG. 8 according to a manufacturing process order.

FIG. 12, FIG. 14, FIG. 16, and FIG. 18 are cross-sectional views taken along line X-X showing the liquid crystal display of FIG. 8 according to a manufacturing process order.

Figure 19:
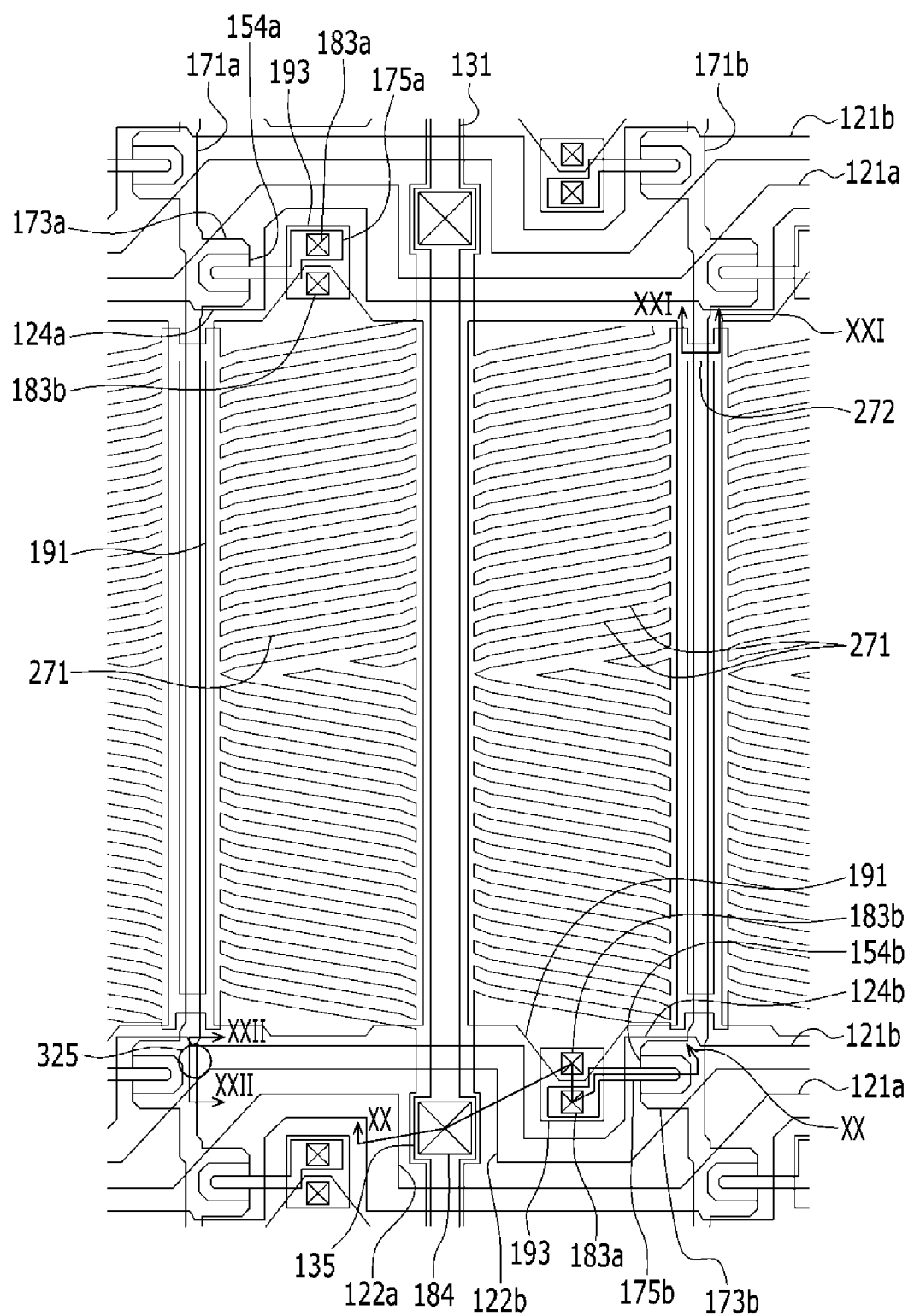

FIG. 19 is a layout view showing some pixels of a liquid crystal display according to exemplary embodiments of the present invention.

Figure 20:
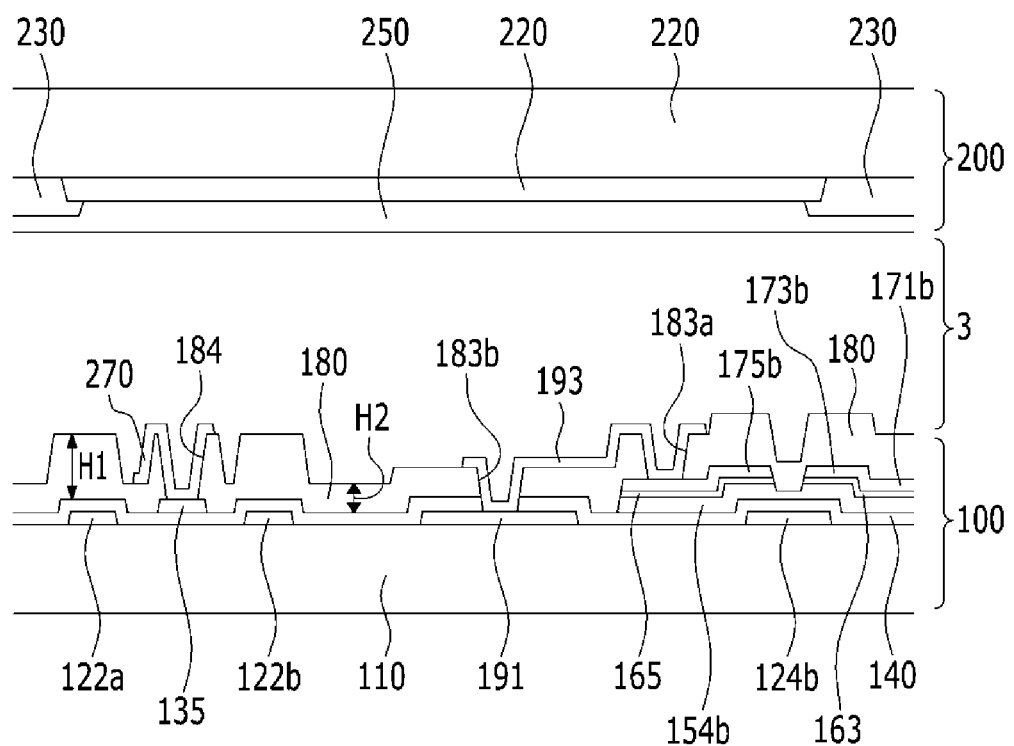

FIG. 20 is a cross-sectional view taken along line XX-XX showing the liquid crystal display of FIG. 19.

Figure 21:
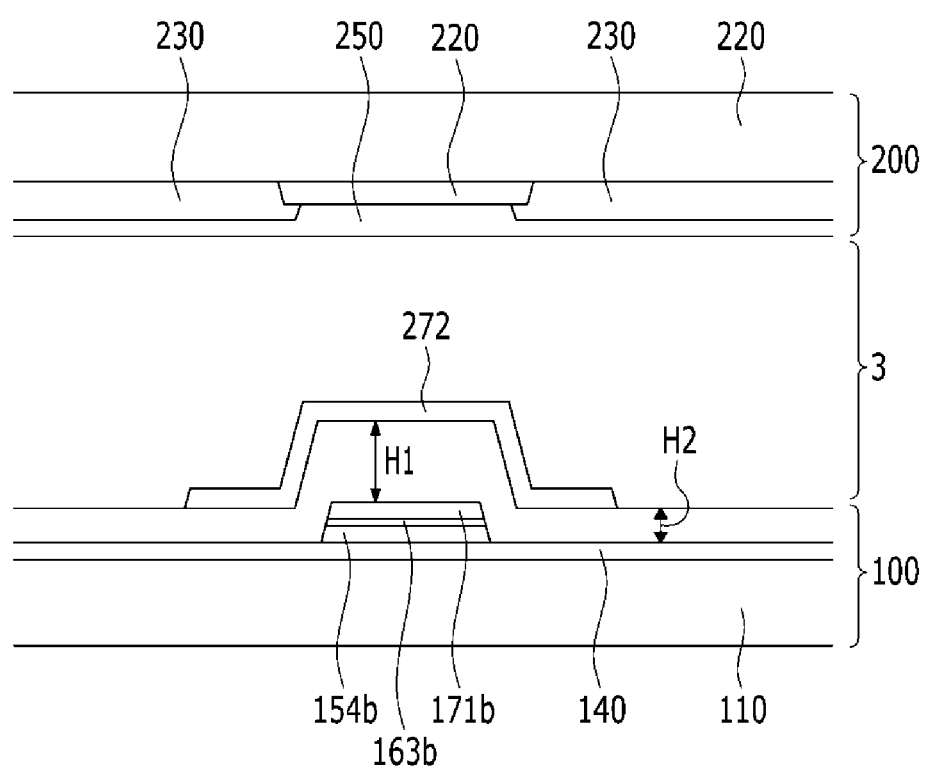

FIG. 21 is a cross-sectional view taken along line XXI-XXI showing the liquid crystal display of FIG. 19.

Figure 22:
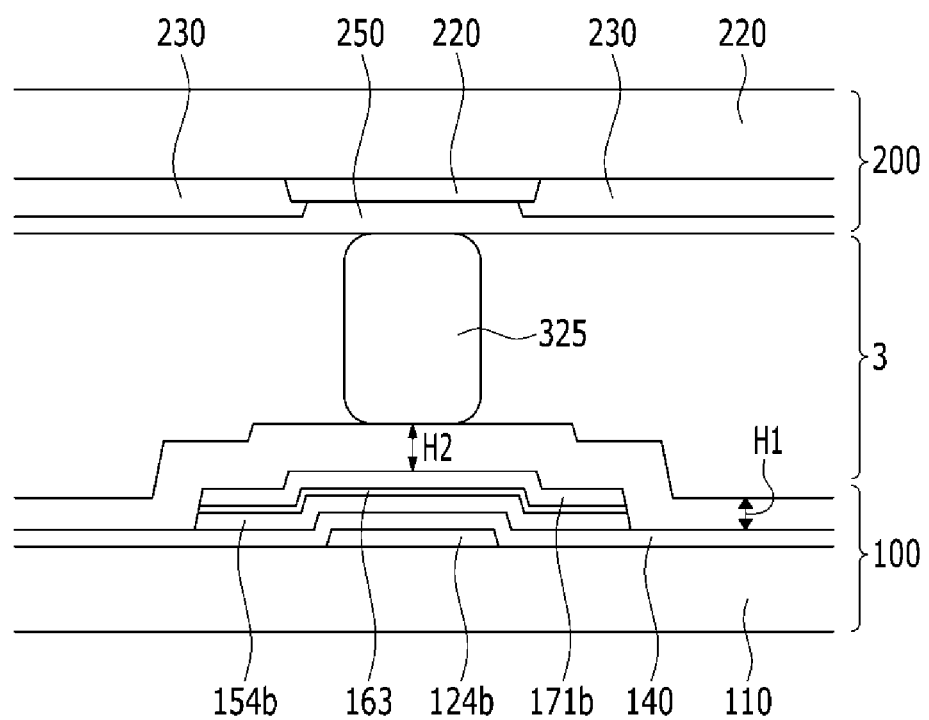

FIG. 22 is a cross-sectional view taken along line XXII-XXII showing the liquid crystal display of FIG. 19.

Figure 23:
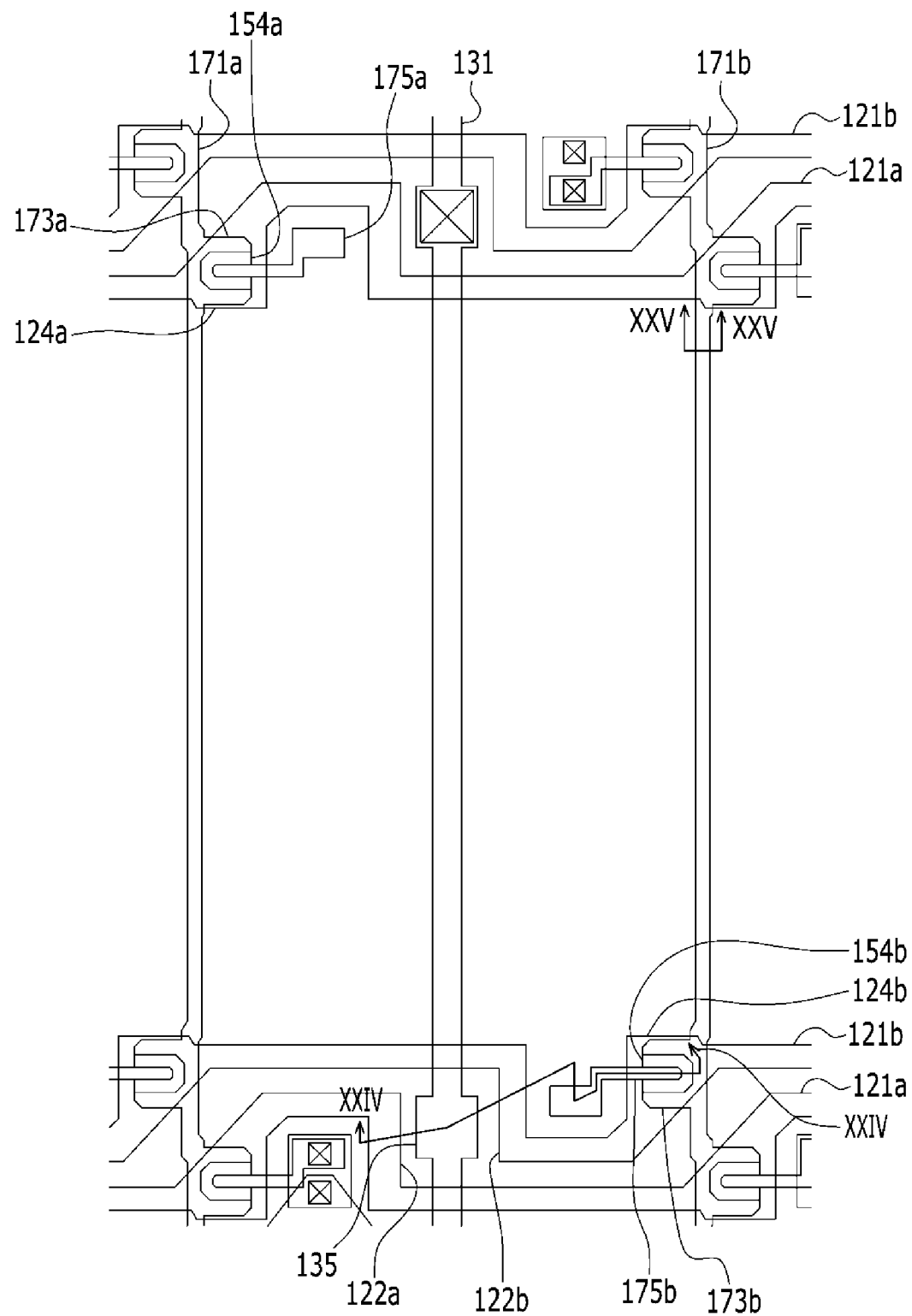
Figure 26:
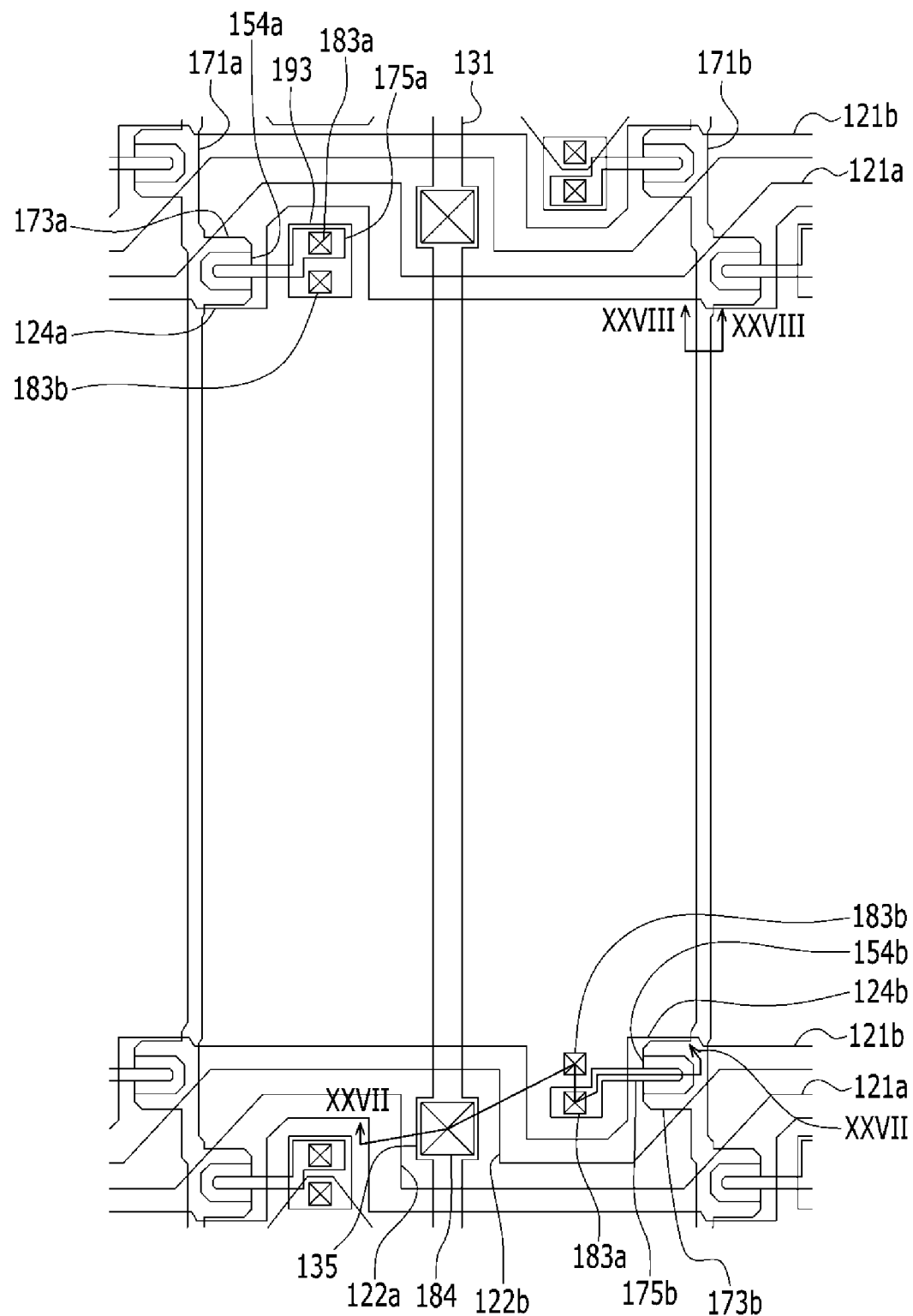

FIG. 23 and FIG. 26 are layout views showing some pixels according to a method of manufacturing the liquid crystal display according to exemplary embodiments of the present invention.

Figure 24:
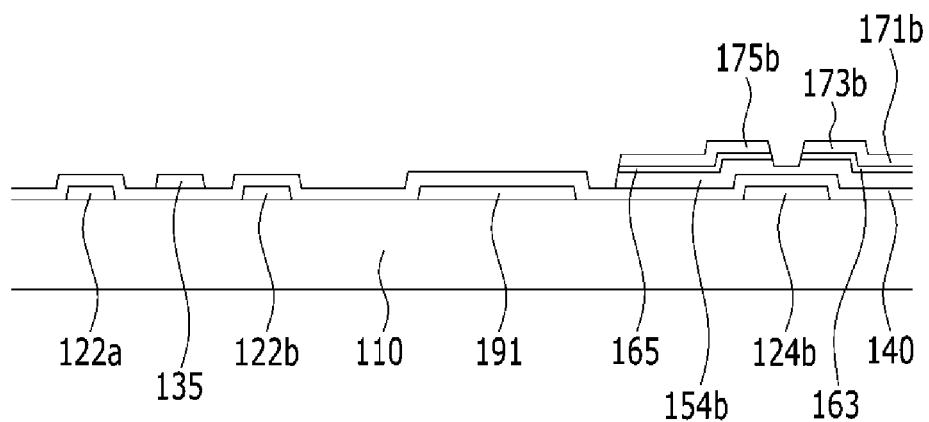

FIG. 24 is a cross-sectional view taken along line XXIV-XXIV showing the liquid crystal display of FIG. 23.

Figure 25:
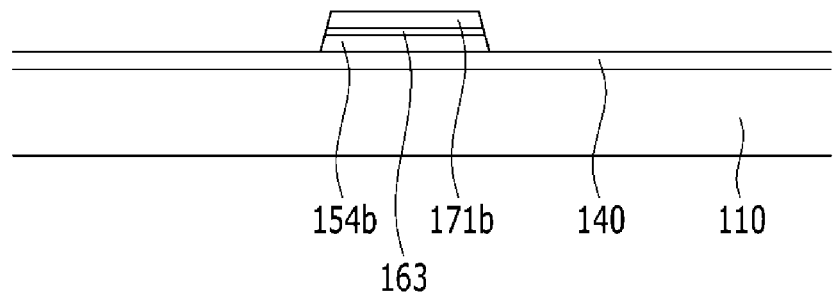

FIG. 25 is a cross-sectional view taken along line XXV-XXV showing the liquid crystal display of FIG. 23.

Figure 27:
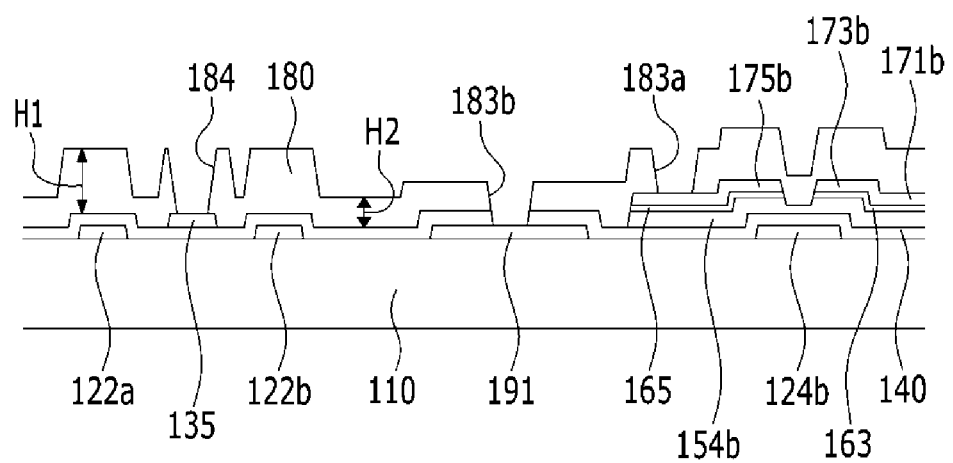

FIG. 27 is a cross-sectional view taken along line XXVII-XXVII showing the liquid crystal display of FIG. 26.

Figure 28:
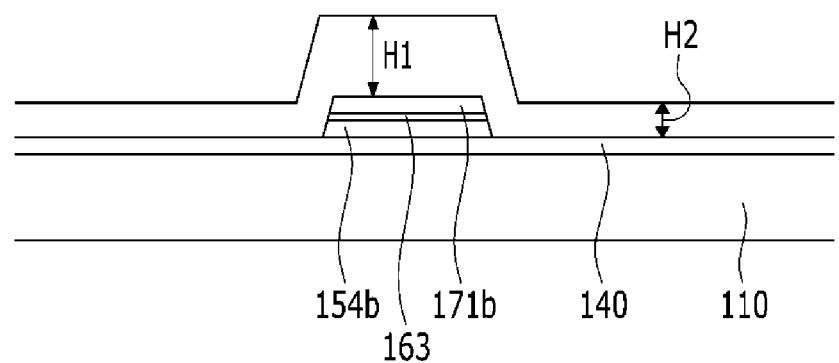

FIG. 28 is a cross-sectional view taken along line XVIII-XXVIII showing the liquid crystal display of FIG. 26.

FIG. 29, FIG. 31, FIG. 33, and FIG. 35 are cross-sectional views taken along line XXV-XXV showing the liquid crystal display of FIG. 26 according to a manufacturing process order.

FIG. 30, FIG. 32, FIG. 34, and FIG. 36 are cross-sectional views taken along line XXVIII-XXVIII showing the liquid crystal display of FIG. 26 according to a manufacturing process order.

Figure 37:
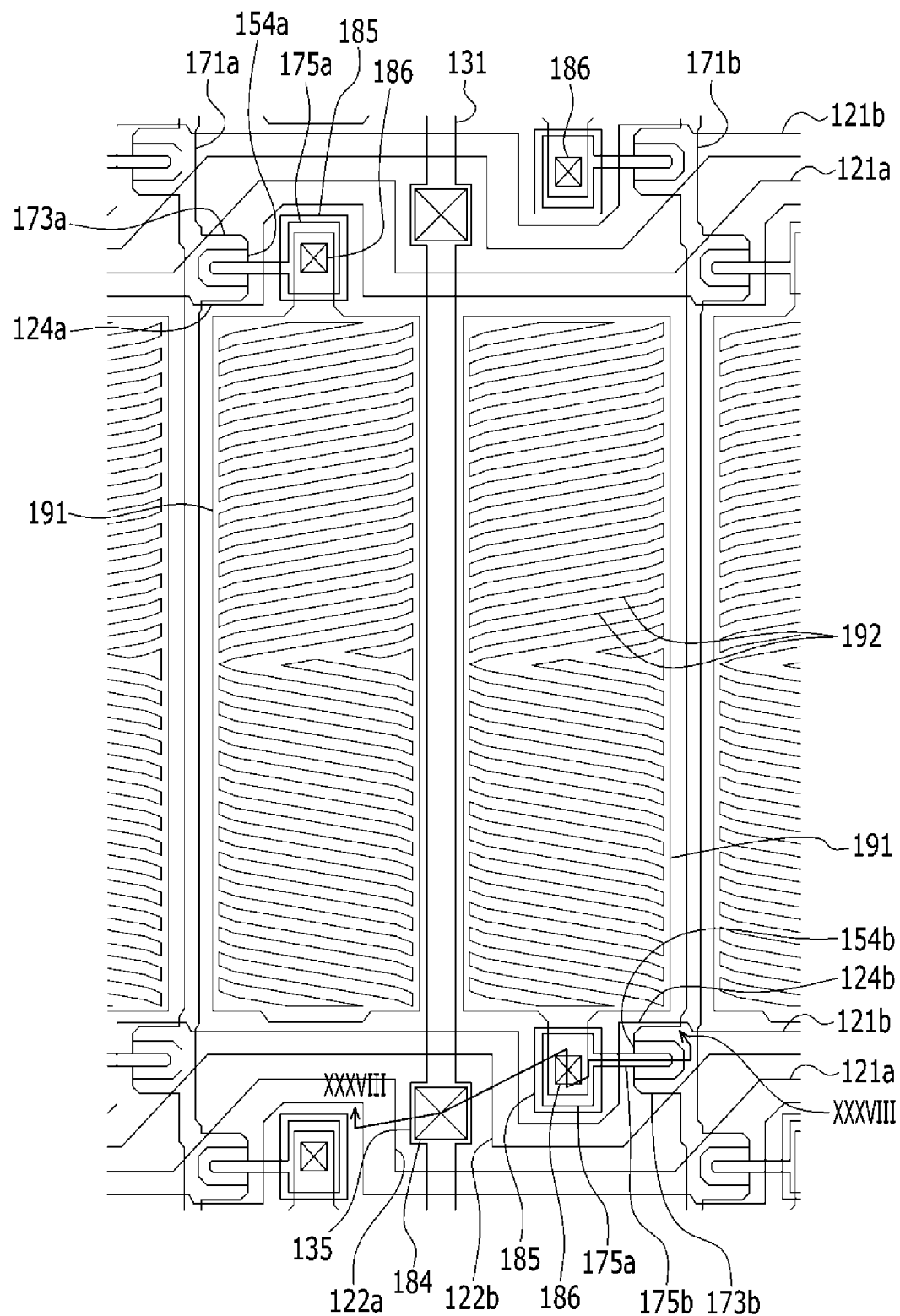

FIG. 37 is a layout view showing some pixels of a liquid crystal display according to exemplary embodiments of the present invention.

Figure 38:
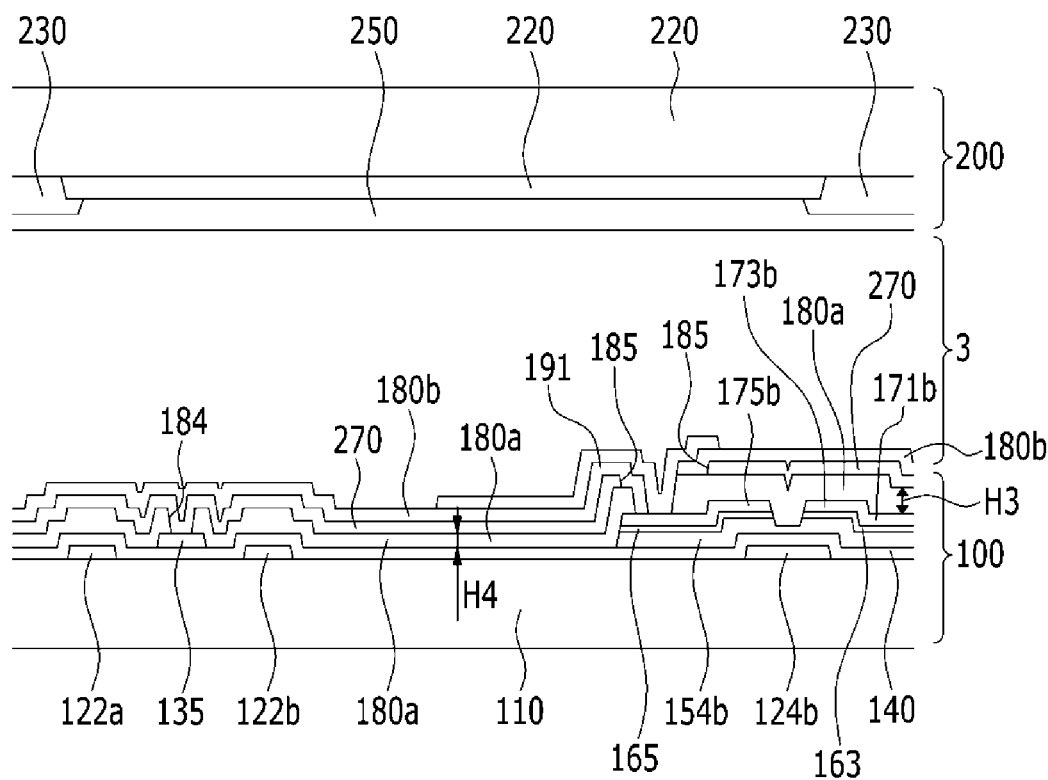

FIG. 38 is a cross-sectional view taken along line XXXVIII-XXXVIII showing the liquid crystal display of FIG. 37.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the invention are described in detail with reference to the accompanying drawings.

Figure 1:
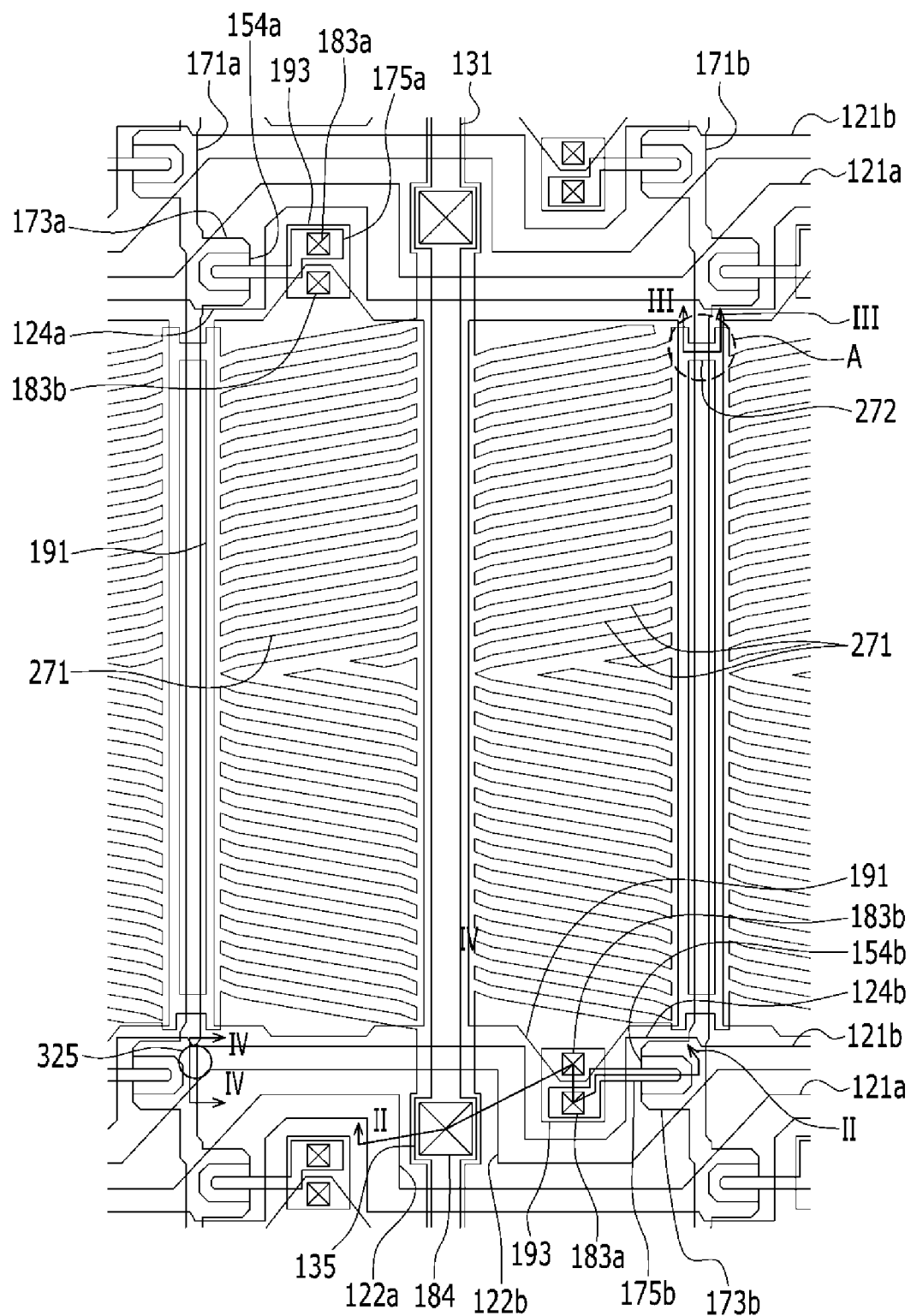
FIG. 1 is a layout view showing some pixels of a liquid crystal display according to exemplary embodiments of the present invention.
Figure 2:
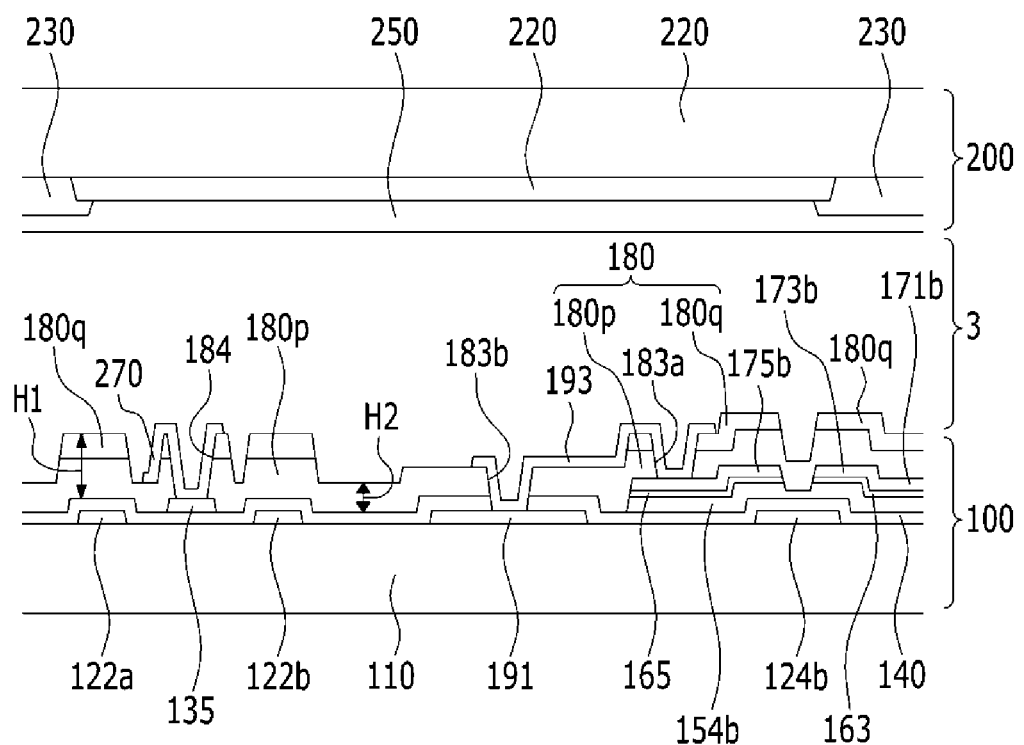
FIG. 2 is a cross-sectional view taken along line II-II showing the liquid crystal display of FIG. 1.
Figure 3:
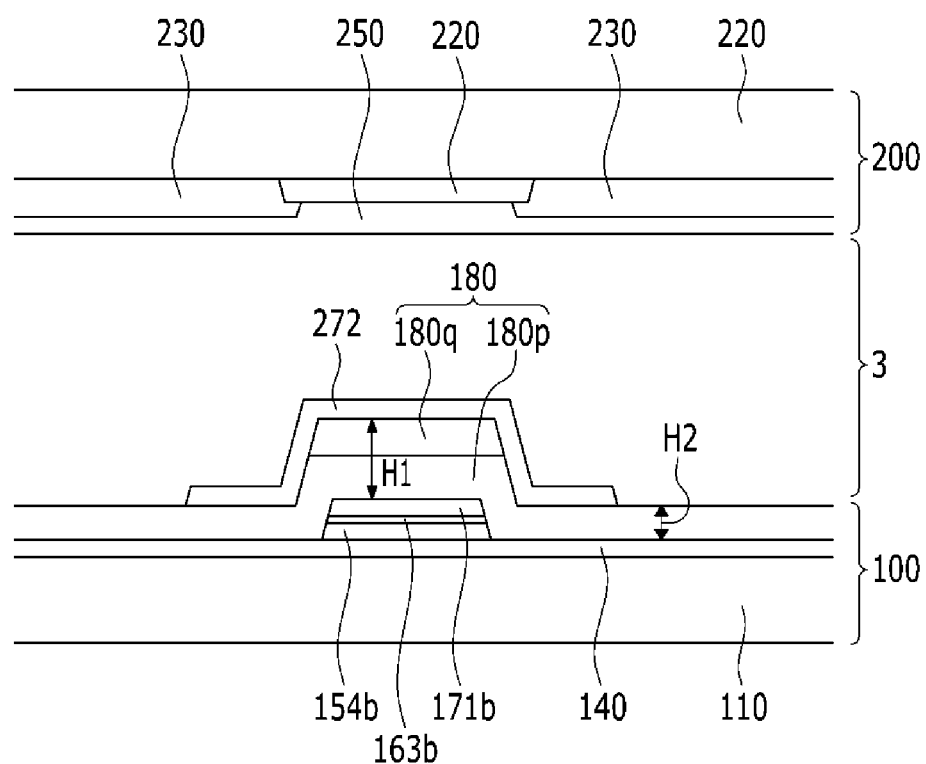
FIG. 3 is a cross-sectional view taken along line III-III showing the liquid crystal display of FIG. 1.
Figure 4:
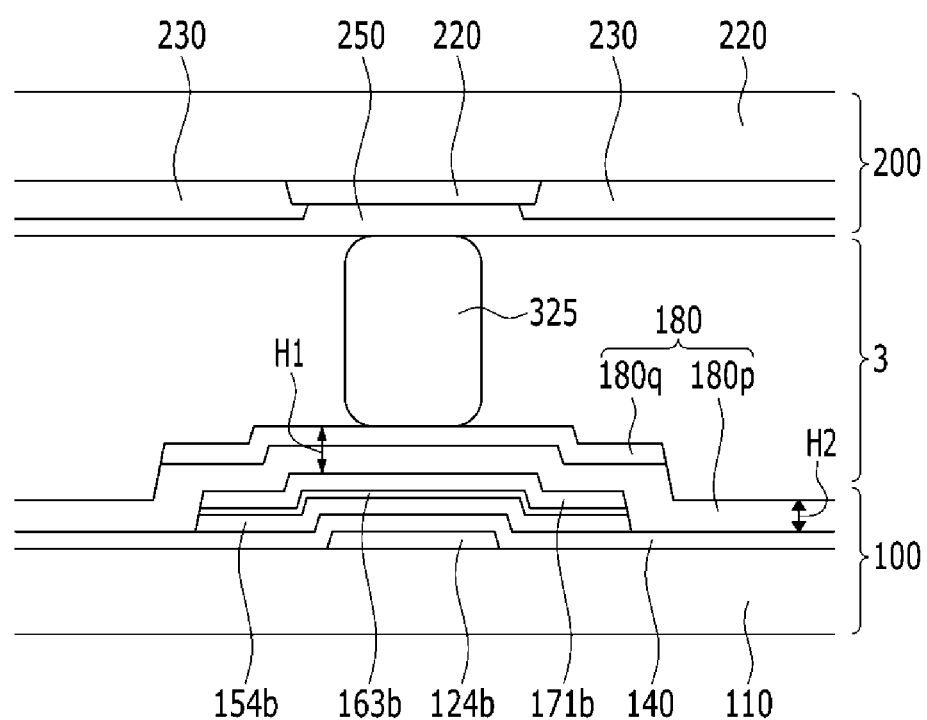
FIG. 4 is a cross-sectional view taken along line IV-IV showing the liquid crystal display of FIG. 1.

First, a liquid crystal display according to exemplary embodiments of the present invention will be described with reference to FIG. 1, FIG. 2, FIG. 3 and FIG. 4. FIG. 1 is a layout view showing some pixels of a liquid crystal display. FIG. 2 is a cross-sectional view showing the liquid crystal display of FIG. 1 taken along line II-II. FIG. 3 is a cross-sectional view showing the liquid crystal display of FIG. 1 taken along line III-III. FIG. 4 is a cross-sectional view showing the liquid crystal display of FIG. 1 taken along line IV-IV.

Referring to FIG. 1, FIG. 2, FIG. 3, and FIG. 4, the liquid crystal display may include a lower panel 100 and an upper panel 200 that face each other, and a liquid crystal layer 3 that may be disposed between the display panel 100 and display panel 200.

A plurality of gate lines 121a and 121b and a plurality of pixel electrodes 191 may be formed on a first insulation substrate 110. The first insulation substrate 110 may be made of transparent glass or plastic material.

The gate lines 121a and 121b may be disposed for each pixel row, and may include a first gate line 121a disposed on an upper side along a pixel row and a second gate line 121b may be disposed on a lower side along the pixel row. The first gate line 121a may be disposed adjacent to a second gate line 121b. The second gate line 121b may be disposed in an adjacent preceding pixel row. The second gate line 121b may be disposed adjacent to a first gate line 121a disposed in an adjacent subsequent pixel row. The first gate line 121a and the second gate line 121b may be disposed in the current pixel row to make pairs with the second gate line 121b and the first gate line 121a disposed in adjacent pixel rows so as to be disposed between the pixel rows.

The first gate line 121a may include a first gate electrode 124a, and the second gate line 121b may include a second gate electrode 124b. The first gate line 121a may include a first vertical portion 122a, and the second gate line 121b may include a second vertical portion 122b.

A pixel electrode 191 may have a planar shape occupying most of a single pixel area. The entire shape of the pixel electrode 191 may be a polygon having sides substantially parallel with the gate lines 121a and 121b, a data line 171a or 171b and a common voltage line 131. The pixel electrode 191 may be made of a transparent conductive material such as indium tin oxide (ITO) or indium zinc oxide (IZO).

The gate lines 121a and 121b and the pixel electrode 191 may be formed on the same layer. The gate lines 121a, and 121b and the pixel electrode 191 may be formed by a photolithography process once using a single photomask. For example, the gate lines 121a and 121b may have a dual-layer structure including an upper layer formed on the same layer as the pixel electrode 191.

A gate insulating layer 140 may be formed on the gate lines 121a and 121b and the pixel electrode 191. The gate insulating layer 140 may be made of an inorganic insulator such as silicon nitride (SiNx) or silicon oxide (SiOx).

A plurality of semiconductors 154a and 154b including a first semiconductor 154a and a second semiconductor 154b may be formed on the gate insulating layer 140. The semiconductors 154a and 154b may be oxide semiconductors. The first semiconductor 154*a* and the second semiconductor 154*b* may be connected to each other.

A plurality of ohmic contacts 163 and 165 may be disposed on the semiconductors 154*a* and 154*b*. The ohmic contacts 163 and 165 may be disposed on the semiconductors 154*a* and 154*b* so as to make a pair while facing each other with respect to each of the gate electrodes 124*a* and 124*b*. The ohmic contacts 163 and 165 may be made of silicide or a material such as n+ hydrogenated amorphous silicon doped with n-type impurity such as phosphorus at a high concentration. However, when the semiconductors 154*a* and 154*b* are oxide semiconductors, the ohmic contacts 161, 163, and 165 may be omitted. When the semiconductors 154*a* and 154*b* are oxide semiconductors, a barrier layer and a capping layer may be formed on and below the semiconductors 154*a* and 154*b*.

A data conductor including a plurality of data lines 171*a* and 171*b*, a plurality of drain electrodes 175*a* and 175*b*, and a plurality of common voltage lines 131 may be formed on the ohmic contacts 163 and 165.

The data lines 171*a* and 171*b* may transfer a data signal and extend substantially in a vertical direction to cross the gate lines 121*a* and 121*b*. The data lines 171*a* and 171*b* may include a first data line 171*a* and a second data line 171*b* between which two pixel electrodes 191 are interposed.

The data lines 171*a* and 171*b* may be disposed one by one for every two pixel columns and the first data line 171*a*. The second data line 171*b* may be alternately connected to pixel electrodes 191 of pixels disposed at left sides and right sides of the data lines 171*a* and 171*b* along a pixel column. Accordingly, each of the data lines 171*a* and 171*b* may be connected to two pixel electrodes 191 disposed in two pixel columns along pixel columns to apply data voltage, thereby reducing the number of the data lines 171*a* and 171*b* by half. Therefore, the cost of the liquid crystal display may be reduced.

The first data line 171*a* may include a first source electrode 173*a* extending toward the first gate electrode 124*a*, and the second data line 171*b* may include a second source electrode 173*b* extending toward the second gate electrode 124*b*.

The first drain electrode 175*a* may have one end facing the first source electrode 173*a* with respect to the first gate electrode 124*a* and the other end having a large area.

The second drain electrode 175*b* may have one end facing the second source electrode 173*b* with respect to the second gate electrode 124*b* and the other end having a large area.

In the liquid crystal display, since the pixel electrode 191 may be formed and subsequently covered with the gate insulating layer 140, and the data conductor may be formed thereon, it data conductor may be prevented from being damaged due to an etchant of the pixel electrode 191, which may occur when the pixel electrode 191 is formed directly on the data conductor.

The common voltage line 131 may be disposed between two data lines 171*a* and 171*b* and may extend in parallel to the data lines 171*a* and 171*b*. The common voltage line 131 may include a plurality of extension portions 135.

The extension portions 135 of the common voltage line 131 may be disposed between the vertical portions 122*a* and 122*b* of the first gate line 121*a* and the second gate line 121*b*.

The extension portions 135 of the common voltage line 131 may be disposed between the vertical portions 122*a* and 122*b* of the first gate line 121*a* and the second gate line 121*b*, so that the area of the gate lines 121*a* and 121*b* and the extension portions 135 of the common voltage line 131 may be reduced.

The common voltage line 131 may be disposed between two pixel electrodes 191 in two pixel areas disposed adjacent to each other in a pixel row direction to prevent light leakage between two pixel electrodes 191.

The first and second gate electrodes 124*a* and 124*b*, the first and second source electrodes 173*a* and 173*b* and the first and second drain electrodes 175*a* and 175*b*, and the first and second semiconductor 154*a* and 154*b* may form a thin film transistor (TFT), which may be a switching element. The semiconductors 154*a* and 154*b* may have substantially the same planar shape as the data lines 171*a* and 171*b*, the drain electrodes 175*a* and 175*b*, and the ohmic contacts 163 and 165, except for a channel region of the thin film transistor.

A first passivation layer 180*p* may be disposed on data conductors 171*a*, 171*b*, 175*a*, 175*b*, and 131. The passivation layer 180*p* may also be disposed on the exposed semiconductors 154*a* and 154*b*. The first passivation layer 180*p* may be made of an inorganic insulating material or an organic insulating material.

When the first passivation layer 180*p* is made of an organic material, the first passivation layer 180*p* may be a color filter 230. Accordingly, when the first passivation layer 180*p* is made of organic material, a color filter 230 disposed on the upper panel 200 is omitted. When the first passivation layer 180*p* is the color filter 230, a light blocking member 220 disposed on the upper panel 200 may also be disposed on the lower panel 100. Accordingly, a light blocking member 220 disposed on the upper panel 200 is omitted.

In the liquid crystal display, since the first passivation layer 180*p* is formed on the pixel electrode 191 covered with the gate insulating layer 140, deterioration of a transmittance due to a haze phenomenon of the pixel electrode 191 formed of ITO at the time of forming the first passivation layer 180*p* may be prevented.

A second passivation layer 180*q* may be disposed on a part of the first passivation layer 180*p*. The second passivation layer 180*q* may be disposed only at a position where the second passivation layer 180*q* overlaps signal lines such as the gate lines 121*a* and 121*b*, the common voltage line 131 and the data lines 171*a* and 171*b*. The second passivation layer 180*q* may also be made of an inorganic insulating material or an organic insulating material.

A first thickness H1 of the passivation layer 180 disposed at a position overlapping signal lines, such as the gate lines 121*a* and 121*b*, the common voltage line 131, and the data lines 171*a* and 171*b*, may be larger than a second thickness H2 of the passivation layer 180 disposed at positions not overlapping signal lines. Accordingly, a height of the passivation layer 180 disposed at the position overlapping signal lines, such as the gate lines 121*a* and 121*b*, the common voltage line 131, and the data lines 171*a* and 171*b*, may be larger than a height of the passivation layer 180 disposed at a position not overlapping the signal lines, such as the gate lines 121*a* and 121*b*, the common voltage line 131, and the data lines 171*a* and 171*b*.

Etching rates of the first passivation layer 180*p* and the second passivation layer 180*q* may be different from each other.

A first contact hole 183*a* may be formed in the passivation layer 180 to partially expose the drain electrodes 175*a* and 175*b*, and a second contact hole 183*b* may be formed in the passivation layer 180 and the gate insulating layer 140 to partially expose the pixel electrode 191. A third contact hole 184 may be formed in the passivation layer 180 to expose some extension portions 135 among the plurality of extension portions 135 of the common voltage line 131. The first contact hole 183*a* and the second contact hole 183*b* may be formed of a single contact hole. For example, a contact hole, which exposes a part of the drain electrodes 175*a* and 175*b* and a part of the pixel electrode 191, may be formed in the passivation layer 180 and the gate insulating layer 140.

The third contact hole 184 exposing the common voltage line 131 may not overlap the gate lines 121a and 121b. The third contact hole 184 exposing the common voltage line 131 may be formed to be spaced apart from the gate lines 121a and 121b, so that static electricity, which may occur during an operation of forming the third contact hole 184, may be prevented from permeating to the gate insulating layer 140 and from causing the gate lines 121a and 121b and the common voltage line 131 to be short circuited.

The extension portions 135 of the common voltage line 131 may be formed so as not to overlap the gate lines 121a and 121b. Accordingly, a step may not be formed on the extension portion 135 of the common voltage line 131. The third contact hole 184 may be symmetrically formed without changing a height according to the position. Accordingly, it may be possible to improve reliability of physical and electric connection between the common voltage line 131 and the common electrode 270 through the third contact hole 184.

The common electrode 270 and a connecting member 193 may be formed on the passivation layer 180. The common electrode 270 and the connecting member 193 may be made of a transparent conductive material such as ITO or IZO.

The common electrode 270 may include a plurality of branch electrodes 271, and may be connected to a common electrode 270 disposed on an adjacent pixel through a connection portion 272.

The common electrode 270 may be physically and electrically connected to the common voltage line 131 through the third contact hole 184 formed in the passivation layer 180 to receive common voltage from the common voltage line 131.

The plurality of branch electrodes 271 of the common electrode 270 may overlap the pixel electrode 191 having the planar shape.

The second passivation layer 180q may be disposed at the position overlapping the signal lines such as the gate lines 121a and 121b, the common voltage line 131 and the data lines 171a and 171b. Accordingly, as shown in FIG. 3, both the first passivation layer 180p and the second passivation layer 180q may be disposed between the data lines 171a and 171b and the connection portion 272 of the common electrode 270. Accordingly, a first thickness H1 of the passivation layer 180 disposed between the data lines 171a and 171b and the connection portion 272 of the common electrode 270 may be larger than a second thickness H2 of the passivation layer 180 disposed at other portions not disposed between data lines 171a and 171b and the connection portion 272 of the common electrode 270. Accordingly, it may be possible to prevent a signal delay of common voltage applied to the common electrode 270, which may occur due to electromagnetic interference of data voltage applied to signal lines such as the data lines 171a and 171b.

The connecting member 193 may cover the first contact hole 183a partially exposing the drain electrodes 175a and 175b. The connecting member 193 may also cover the second contact hole 183b partially exposing the pixel electrode 191 to physically and electrically connect the drain electrodes 175a and 175b and the pixel electrode 191.

The pixel electrode 191 may be electrically connected to the drain electrodes 175a and 175b through the connecting member 193 to receive data voltage.

The pixel electrode 191 receiving the data voltage may generate an electric field in the liquid crystal layer 3 along with the common electrode 270 receiving the common voltage. The pixel electrode 191 and the common electrode 270 may constitute a first field generating electrode and a second field generating electrode, and an electric field generated between the first field generating electrode and the second field generating electrode may be applied to the liquid crystal layer 3.

The second passivation layer 180q may be disposed at the position overlapping the signal lines such as the gate lines 121a and 121b, the common voltage line 131, and the data lines 171a and 171b. Accordingly, only the first passivation layer 180p may be disposed between the pixel electrode 191 and the common electrode 270. The second thickness H2 of the passivation layer 180 disposed between the pixel electrode 191 and the common electrode 270 may be smaller than the first thickness H1 of the passivation layer 180 disposed between the signal line and the common electrode 270. In an aperture region of the liquid crystal display, the intensity of the electric field between the common electrode 270 and the pixel electrode 191 may thus be prevented from being reduced, and a signal delay of the common voltage of the common electrode 270 along signal lines such as the data lines 171a and 171b, may be prevented.

As shown in FIG. 3, both the first passivation layer 180p and the second passivation layer 180q may be disposed between the data lines 171a and 171b and the connection portion 272 of the common electrode 270. The first thickness H1 of the passivation layers 180p and 180q disposed between the data lines 171a and 171b and the connection portion 272 of the common electrode 270 disposed may be larger than the second thickness H2 of the passivation layer 180p disposed on the other portion. Accordingly, a signal delay of the common voltage applied to the common electrode 270 may be prevented that may occur due to electromagnetic interference of data voltage applied to the signal line, such as the data lines 171a and 171b.

In some cases, as shown, the common electrodes 270 disposed in adjacent pixel areas between which the data lines 171a and 171b are interposed, may be connected to each other through the connection portions 272. In some cases, however, the first passivation layer 180p and the second passivation layer 180q having a large thickness may be present between the data lines 171a and 171b and the common electrode 270 disposed thereon, so that a signal delay of common voltage may be reduced along the data lines 171a and 171b, thereby covering all the data lines 171a and 171b with the common electrode 270.

A first alignment layer (not shown) may be coated on an inner surface of the lower panel 100. Hereinafter, the upper panel 200 will be described.

A light blocking member 220 may be formed on a second insulation substrate 210 made of transparent glass or plastic. The light blocking member 220 may be called a black matrix and may prevent light leakage.

A plurality of color filters 230 may be formed on the second substrate 210. The color filters 230 may be present in a region surrounded by the light blocking member 220 and may be elongated along a pixel electrode 191 column in a vertical direction. Each of the color filters 230 may display one of the primary colors (e.g., such as red, green and blue). Other examples of colors that may be displayed include yellow, cyan, and magenta. Although not shown, the color filter may further include a color filter displaying a mixed color of the primary colors, white color, and/or colors other than the primary colors.

When the first passivation layer 180p is made of an organic material, the first passivation layer 180p may be the color filter 230. Accordingly, the color filter 230 disposed on the upper panel 200 may be omitted. Further, when the first passivation layer 180p is a color filter 230, the light blocking member 220 disposed on the upper panel 200 may also be disposed on the lower panel 100. Accordingly, the light blocking member 220 disposed on the upper panel 200 may be omitted.

An overcoat 250 may be formed on the color filter 230 and the light blocking member 220. The overcoat 250 may be made of an organic insulator, may prevent the color filter 230 from being exposed, and may provide a flat surface. The overcoat 250 may be omitted.

A second alignment layer (not shown) may be coated on an inner surface of the upper panel 200.

A spacer 325 may be disposed between the lower panel 100 and the upper panel 200. The spacer 325 may be disposed at a position overlapping signal lines such as the gate lines 121a and 121b, the common voltage line 131 and the data lines 171a and 171b. For example, the spacer 325 may be positioned in a region where the second gate electrode 124b overlaps the second data line 171b. For example, the spacer 325 may be disposed at a position overlapping signal lines such as the gate lines 121a and 121b, the common voltage line 131, and the data lines 171a and 171b.

The spacer 325 may be disposed at the position overlapping the signal lines such as the gate lines 121a and 121b, the common voltage line 131, and the data lines 171a and 171b, so that both the first passivation layer 180p and the second passivation layer 180q may be present in the region where the spacer 325 is disposed. The spacer 325 may be disposed on the passivation layer 180 having a relatively large first thickness H1, and thus a desired cell gap may be maintained while the spacer 325 is formed to have a small height. As a height of the spacer 325 is reduced, the width of the spacer 325 may be reduced and the width of the light blocking member for covering the spacer may be narrowed. Accordingly, it may be possible to prevent an aperture ratio of the liquid crystal display from being reduced.

The liquid crystal layer 3 interposed between the lower panel 100 and the upper panel 200 contains liquid crystal molecules (not shown) and the liquid crystal molecules may be aligned such that long axes may be horizontal to the surfaces of the two display panels 100 and 200 in the absence of an electric field.

The liquid crystal layer 3 may have a positive dielectric anisotropy or a negative dielectric anisotropy. A liquid crystal molecule of the liquid crystal layer 3 may be aligned to have a pretilt in a predetermined direction. The pretilt direction of the liquid crystal molecule may be changed depending on the dielectric anisotropy of the liquid crystal layer 3.

A backlight unit (not shown) may be additionally included outside the first substrate 110 of the lower panel 100 to generate light and provide the light to the two display panels 100 and 200.

The pixel electrode 191 to which the data voltage is applied may generate an electric field in the liquid crystal layer 3 along with the common electrode 131 receiving common voltage to determine a direction of the liquid crystal molecule of the liquid crystal layer 3 and display a corresponding image.

Figure 9:
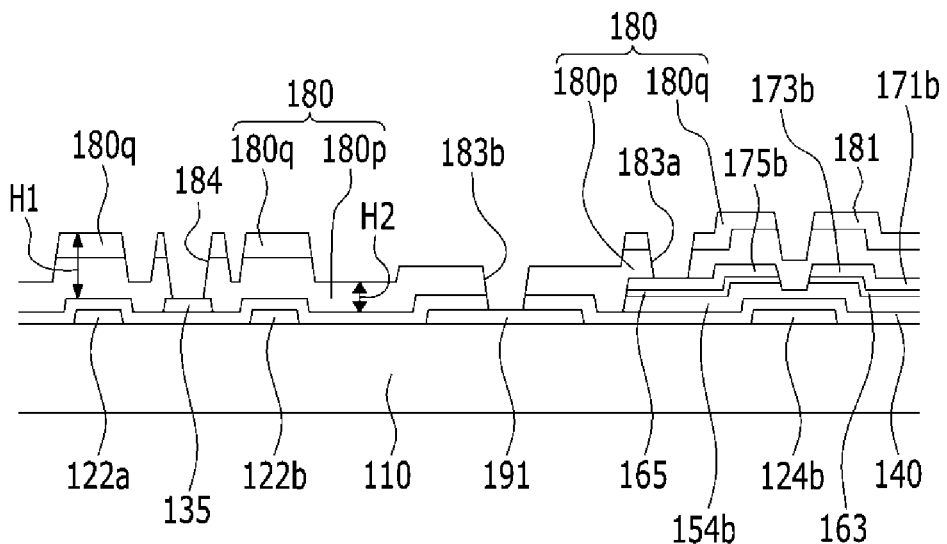
FIG. 9 is a cross-sectional view taken along line IX-IX showing the liquid crystal display of FIG. 8.
Figure 10:
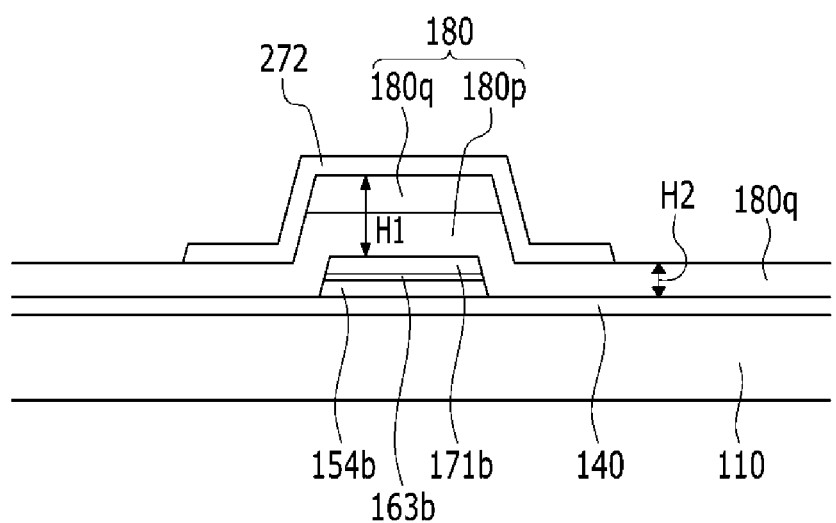
FIG. 10 is a cross-sectional view taken along line X-X showing the liquid crystal display of FIG. 8.

A manufacturing method of a liquid crystal display will be described with reference to FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18 along with FIG. 1, FIG. 2, and FIG. 3. FIG. 5, FIG. 6, FIG. 7, and FIG. 8 are layout views showing pixels according to a method of manufacturing a liquid crystal display. FIG. 6 is a cross-sectional view showing the liquid crystal display of FIG. 5 taken along line VI-VI and FIG. 7 is a cross-sectional view showing the liquid crystal display of FIG. 5 taken along line VII-VII. FIG. 9 is a cross-sectional view showing the liquid crystal display of FIG. 8 taken along line IX-IX and FIG. 10 is a cross-sectional view showing the liquid crystal display of FIG. 8 taken along line X-X. FIG. 11, FIG. 13, FIG. 15, and FIG. 17 are cross-sectional views showing the liquid crystal display of FIG. 8 taken along line IX-IX according to a manufacturing process order, and FIG. 12, FIG. 14, FIG. 16 and FIG. 18 are cross-sectional views showing the liquid crystal display of FIG. 8 taken along line X-X according to a manufacturing process order.

Figure 5:
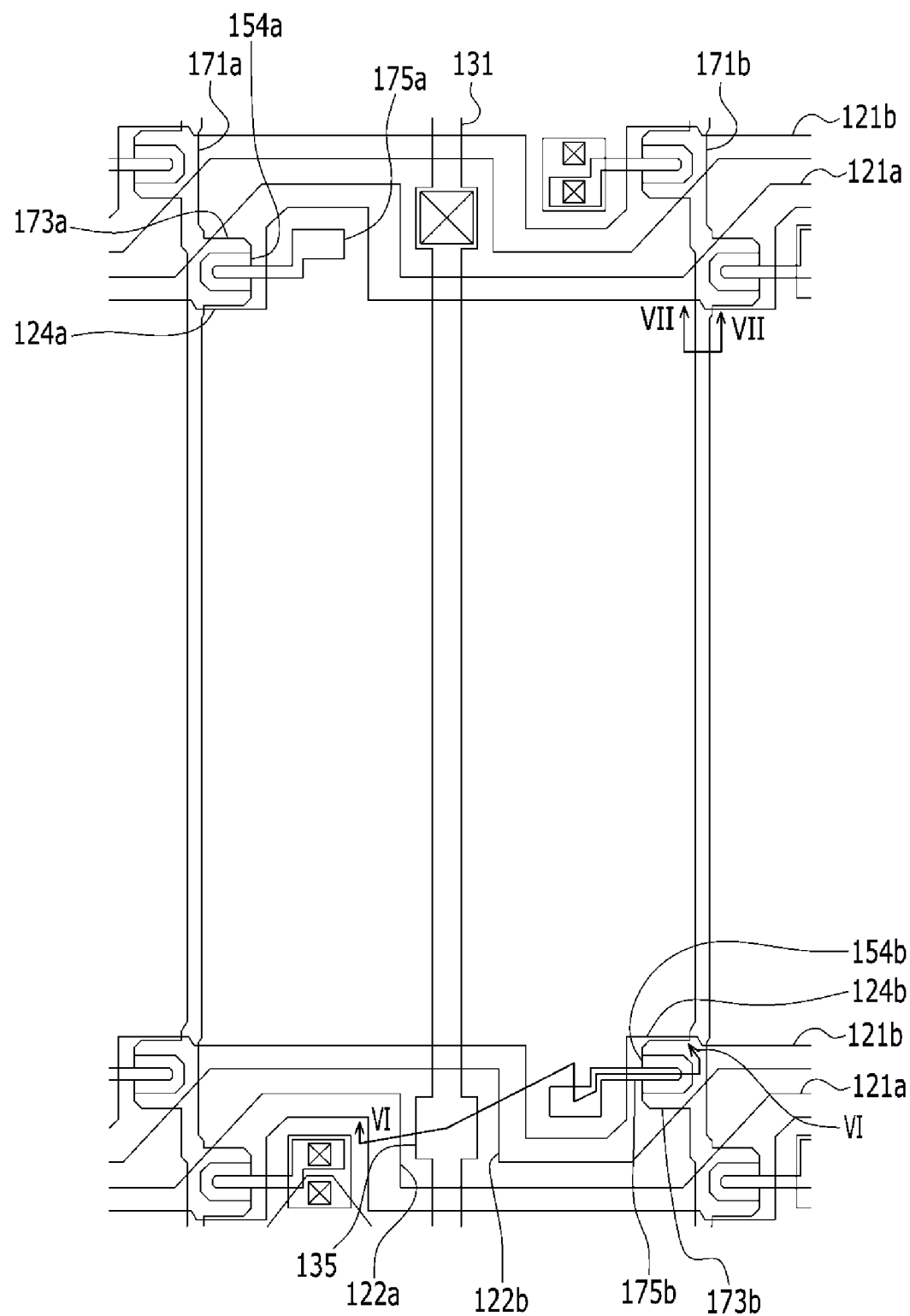
FIG. 5 and FIG. 8 are layout views showing some pixels according to a method of manufacturing a liquid crystal display according to exemplary embodiments of the present invention.
Figure 6:
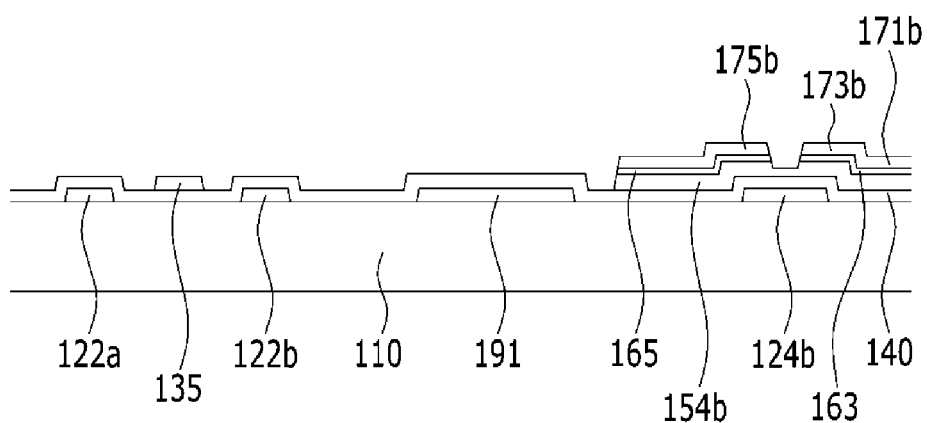
FIG. 6 is a cross-sectional view taken along line VI-VI showing the liquid crystal display of FIG. 5.
Figure 7:
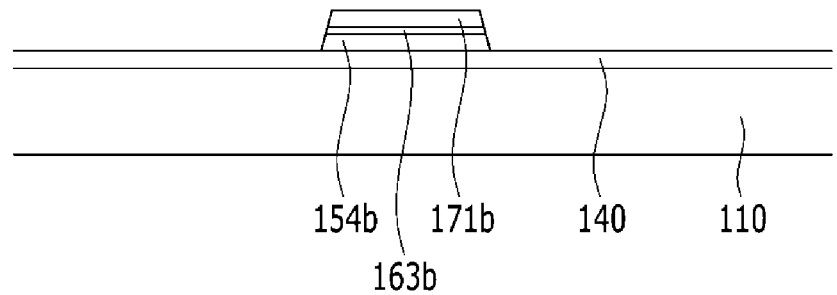
FIG. 7 is a cross-sectional view taken along line VII-VII showing the liquid crystal display of FIG. 5.

Referring to FIG. 5, FIG. 6, and FIG. 7, a first gate line 121a including a first gate electrode 124a, a second gate line 121b including a second gate electrode 124b, and a pixel electrode 191 may be formed on a first insulation substrate 110. A gate insulating layer 140 may be stacked on the first gate line 121a, the second gate line 121b, and the pixel electrode 191.

A semiconductor layer, a semiconductor layer doped with impurity, and a data conductive layer may be stacked and subjected to photolithography to form a first semiconductor 154a, a second semiconductor 154b, ohmic contacts 163 and 165, data lines 171a and 171b, drain electrodes 175a and 175b and a common voltage line 131.

As shown in FIG. 8, FIG. 9, and FIG. 10, a passivation layer 180 including a first passivation layer 180p and a second passivation layer 180q positioned at a part of the first passivation layer 180p, may be formed on data conductors 171a, 171b, 175a, 175b, and 131 and the exposed semiconductors 154a and 154b with contact holes 183a, 183b, and 184. Etching rates of the first passivation layer 180p and the second passivation layer 180q may differ.

A method of forming the passivation layer 180 will be described in more detail with reference to FIG. 11, FIG. 12, FIG. 13, FIG. 14, FIG. 15, FIG. 16, FIG. 17, and FIG. 18.

Figure 11:
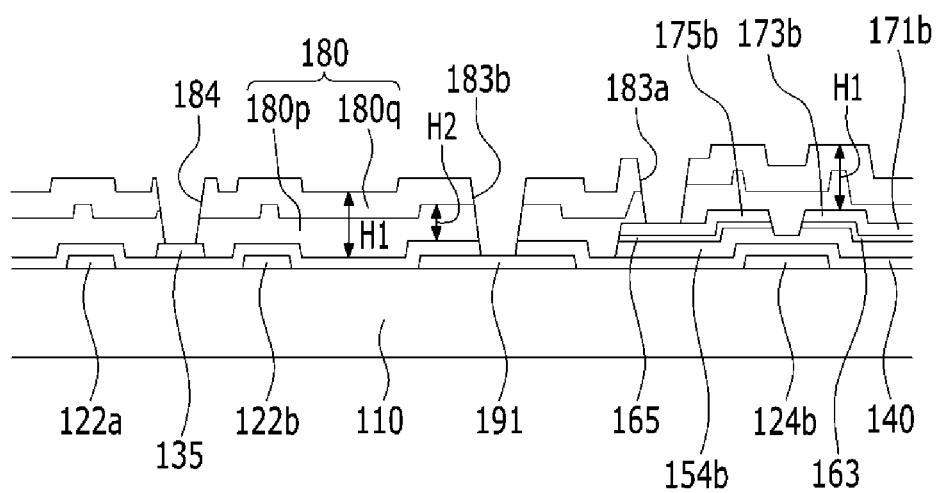
Figure 12:
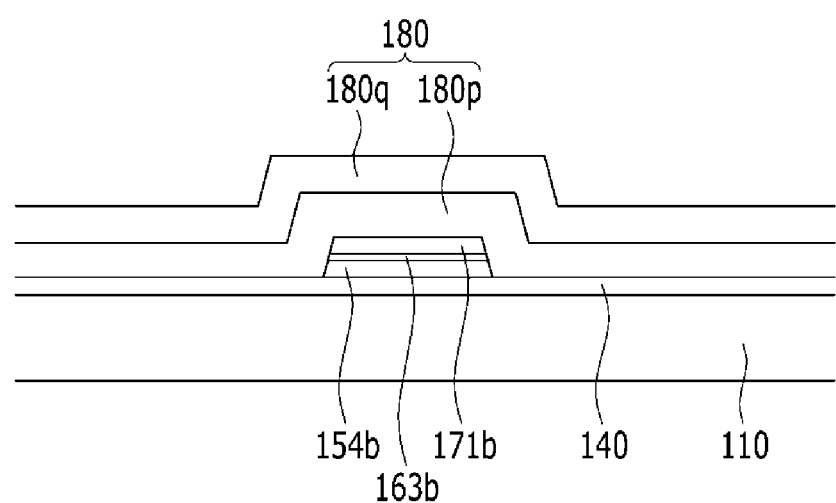

As shown in FIG. 11 and FIG. 12, the first passivation layer 180p and the second passivation layer 180q made of an inorganic insulating material or an organic insulating material may be stacked on the data conductors 171a, 171b, 175a, 175b, and 131 and the exposed semiconductors 154a and 154b, and may then subjected to photolithography to form a first contact hole 183a. A second contact hole 183b and a third contact hole 184 may be formed by etching the first passivation layer 180p and the second passivation layer 180q together with the gate insulating layer 140.

Figure 13:
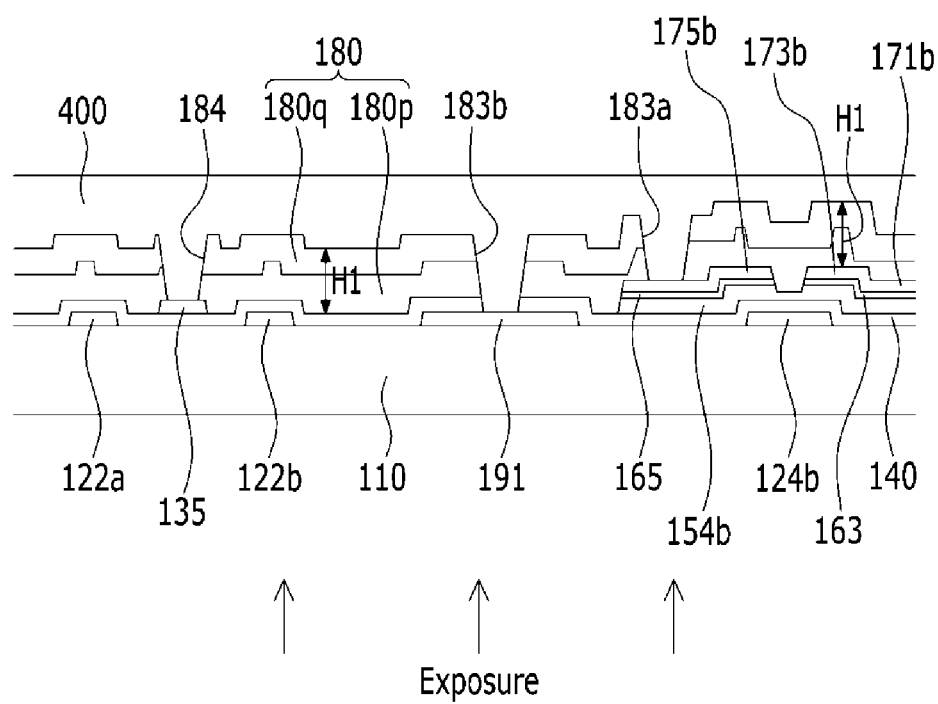
Figure 14:
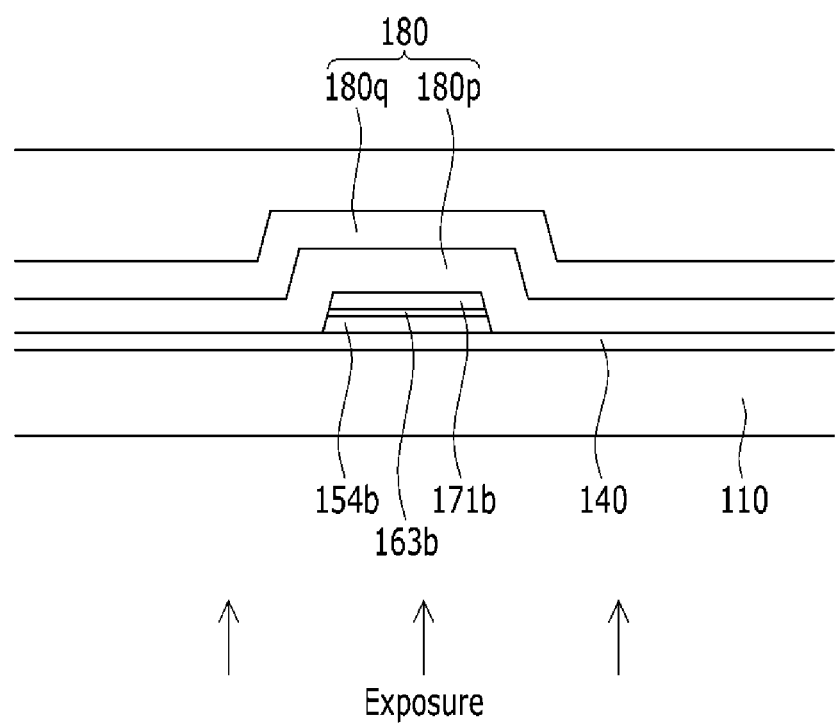
Figure 15:
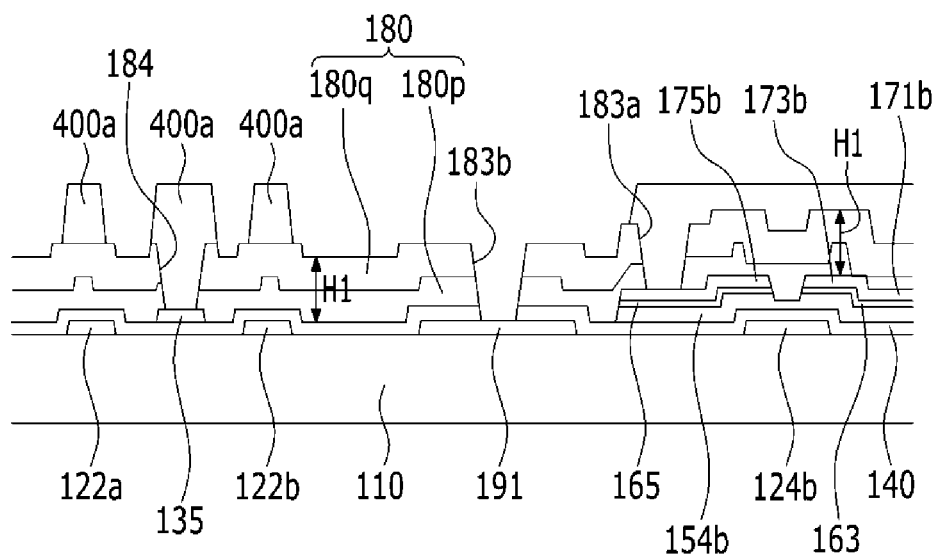
Figure 16:
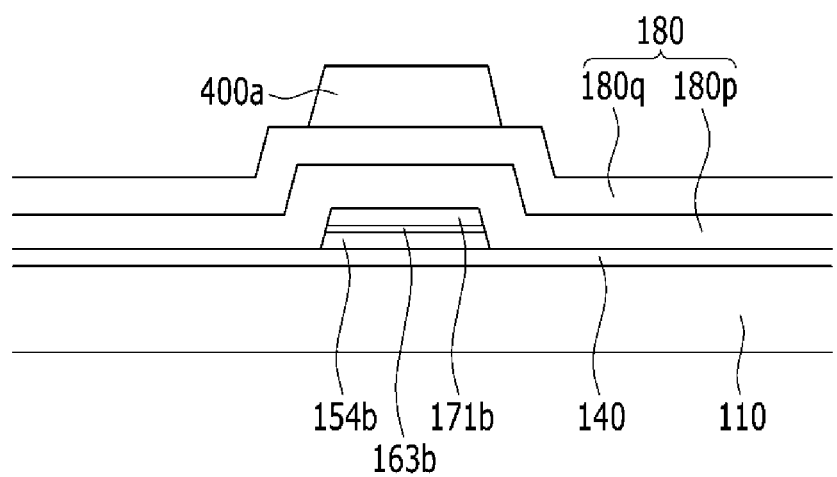

As shown in FIG. 13 and FIG. 14, a photosensitive film 400 may be stacked on the second passivation layer 180q and subjected to back exposure from a first insulation substrate 110 side. Accordingly, when the back exposure is performed from the first insulation substrate 110 side, light incident at the time of exposure may not pass through signal lines such as the gate lines 121a and 121b, the common voltage line 131, and the data lines 171a and 171b, and may pass through only the remaining portion. Accordingly, opaque signal lines such as the gate lines 121a and 121b, the common voltage line 131, and the data lines 171a and 171b may serve as an exposure mask. The photosensitive film 400 exposed may be printed to form a photosensitive film pattern 400a disposed only at a position overlapping the signal lines such as the gate lines 121a and 121b, the common voltage line 131, and the data lines 171a and 171b, as shown in FIG. 15 and FIG. 16.

Figure 17:
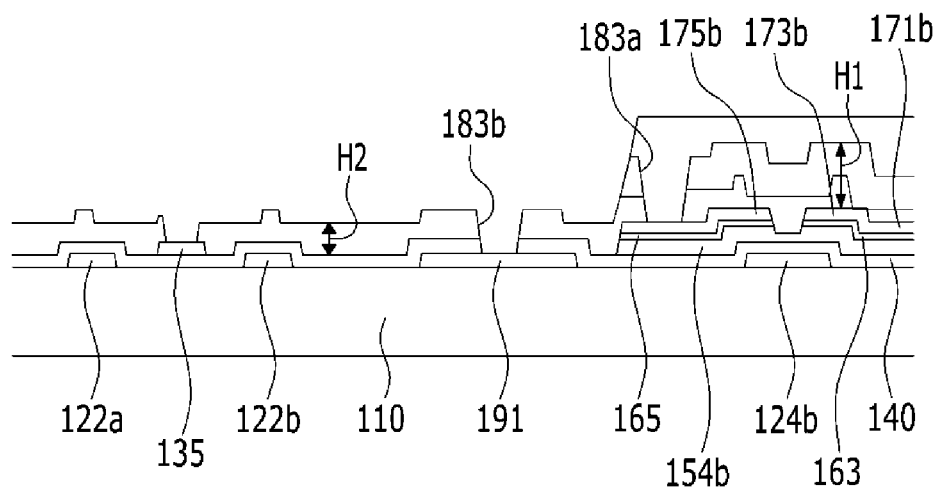
Figure 18:
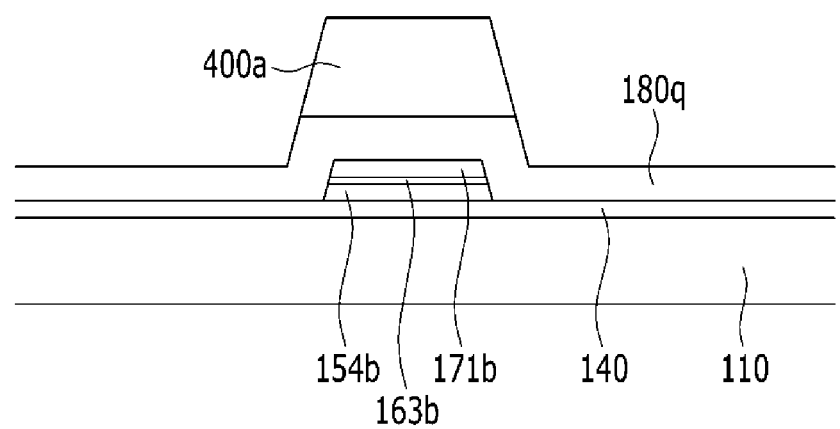

As shown in FIG. 17 and FIG. 18, using the photosensitive film pattern 400a as an etching mask, the second passivation layer 180q may be etched and the photosensitive film pattern 400a may be removed.

Through the process, the second passivation layer 180q disposed only at a part of the first passivation layer 180p may be formed. The second passivation layer 180p may be disposed only at a position overlapping signal lines, such as the gate lines 121a and 121b, the common voltage line 131 and the data lines 171a and 171b. A first thickness H1 of the passivation layer 180p and 180q disposed at the position overlapping signal lines, such as the gate lines 121a and 121b, the common voltage line 131, and the data lines 171a and 171b, may be larger than a second thickness H2 of the first passivation layer 180p disposed at other portions not overlapping the signal lines. Consequently, a height of the passivation layer 180 disposed at the position overlapping the signal lines, such as the gate lines 121a and 121b, the common voltage line 131, and the data lines 171a and 171b, may be higher than a height of the passivation layer 180 disposed at a position not overlapping the signal lines such as the gate lines 121a and 121b, the common voltage line 131, and the data lines 171a and 171b.

A common electrode 270 and a connecting member 193 may be formed on the passivation layer 180, a light blocking member 220, and a color filter 230. An overcoat 250 may be formed on the second insulation substrate 210. A spacer 325 may be formed on the first insulation substrate 110 or the second insulation substrate 210. The first insulation substrate 110 and the second insulation substrate 210 may be coupled to face each other and a liquid crystal layer 3 may be injected, so that the liquid crystal display may be completed as shown in FIG. 1, FIG. 2, FIG. 3, and FIG. 4.

A liquid crystal display will be described with reference to FIG. 19, FIG. 20, FIG. 21 and FIG. 22. FIG. 19 is a layout view showing some pixels of a liquid crystal display. FIG. 20 is a cross-sectional view showing the liquid crystal display of FIG. 19 taken along line XX-XX. FIG. 21 is a cross-sectional view showing the liquid crystal display of FIG. 19 taken along line XXI-XXI. FIG. 22 is a cross-sectional view showing the liquid crystal display of FIG. 19 taken along line XXII-XXII.

Referring to FIG. 19, FIG. 20, FIG. 21, and FIG. 22, the liquid crystal display is similar to the liquid crystal display described with reference to FIG. 1. FIG. 2, FIG. 3 and FIG. 4. A detailed description of like constituent elements will be omitted, and the differences from the liquid crystal display of FIG. 1, FIG. 2, FIG. 3, and FIG. 4 will be further described.

A plurality of gate lines 121a and 121b and a plurality of pixel electrodes 191 may be formed on the first insulation substrate 110. A first gate line 121a may include a first gate electrode 124a and a second gate line 121b may include a second gate electrode 124b.

A gate insulating layer 140 may be formed on the gate lines 121a and 121b and the pixel electrode 191.

A plurality of semiconductors 154a and 154b including a first semiconductor 154a and a second semiconductor 154b may be formed on the gate insulating layer 140. A plurality of ohmic contacts 163 and 165 may be disposed on the semiconductors 154a and 154b.

A data conductor including a plurality of data lines 171a and 171b, a plurality of drain electrodes 175a and 175b, and a plurality of common voltage lines 131 may be formed on the ohmic contacts 163 and 165.

A passivation layer 180 may be formed on the data conductor 171a, 171b, 175a, 175b, and 131 and the exposed semiconductors 154a and 154b. A first contact hole 183a partially exposing the drain electrodes 175a and 175b may be formed in the passivation layer 180 and a second contact hole 183b partially exposing the pixel electrode 191 may be formed in the passivation layer 180 and the gate insulating layer 140. A third contact hole 184 exposing some extension portions 135 among a plurality of extension portions 135 of the common voltage line 131 may be formed in the passivation layer 180. The passivation layer 180 may be made of an inorganic insulating material, or an organic insulating material.

A common electrode 270 and a connecting member 193 may be formed on the passivation layer 180.

However, in the liquid crystal display according to the present exemplary embodiment, unlike the liquid crystal display according to the exemplary embodiment shown in FIG. 1, FIG. 2, FIG. 3, and FIG. 4, the passivation layer 180 may be a single layer and may have a thickness which may be changed according to a position.

The passivation layer 180 may have a first portion, which is disposed at a position overlapping signals lines such as the gate lines 121a and 121b, the common voltage line 131 and the data lines 171a and 171b, and a second portion, which is disposed at the remaining portion not overlapping the signal lines such as the gate lines 121a and 121b, the common voltage line 131 and the data lines 171a and 171b. A first thickness H1 of the first portion of the passivation layer 180 may be larger than a second thickness H2 of the second portion of the passivation layer 180.

The second portion of the passivation layer 180 may be formed such that the passivation layer 180 may be partially etched and removed, and a part of the passivation layer 180 may remain. The second portion may be thinner than the first portion.

Accordingly, a height of the passivation layer 180 disposed at the position overlapping signal lines such as the gate lines 121a and 121b, the common voltage line 131 and the data lines 171a and 171b may be higher than a height of the passivation layer 180 disposed at the position not overlapping the signal lines such as the gate lines 121a and 121b, the common voltage line 131 and the data line 171a and 171b.

As described above, the passivation layer 180 may include the first portion disposed at the position overlapping the signal lines such as the gate lines 121a and 121b, the common voltage line 131 and the data lines 171a and 171b, and the second portion disposed at remaining positions not overlapping the signal lines. As shown in FIG. 21, the first thickness H1 of the first portion of the passivation layer 180 disposed between the data lines 171a and 171b and a connection portion 272 of the common electrode 270 may be larger than the second thickness H2 of the second portion of the passivation layer 180 disposed at a position other than the first portion. Accordingly, it is possible to prevent a signal delay of common voltage applied to the common electrode 270 which may occur due to electromagnetic interference of data voltage applied to signal lines such as the data lines 171a and 171b.

Additionally, the second portion of the passivation layer 180 having the second thickness H2, which may be relatively thin, may be disposed in an aperture region where the pixel electrode 191 overlaps the common electrode 270. In the aperture region of the liquid crystal display, it may be possible to prevent the intensity of the electric field between the common electrode 270 and the pixel electrode 191 from being reduced and to prevent a signal delay of the common voltage of the common electrode 270 according to the signal lines such as the data lines 171a and 171b.

The common electrodes 270 disposed in adjacent pixel areas between which the data lines 171a and 171b are interposed may be connected to each other through the connection portions 272. The first passivation layer 180p and the second passivation layer 180q having a large thickness may all be disposed between the data lines 171a and 171b and the common electrode 270, so that a signal delay of common voltage along the data lines 171a and 171b may be reduced.

A spacer 325 may be disposed between the lower panel 100 and the upper panel 200. As shown in FIG. 22, the spacer 325 may be disposed at a position overlapping signal lines such as the gate lines 121a and 121b, the common voltage line 131 and the data lines 171a and 171b. The spacer 325 may be disposed in a region where the second gate electrode 124b overlaps the second data line 171b. The spacer 325 may be disposed at a position where the spacer 325 overlaps signal lines, such as the gate lines 121a and 121b, the common voltage line 131, and the data lines 171a and 171b.

Accordingly, the spacer 325 may be disposed at the position overlapping the signal lines such as the gate lines 121a and 121b, the common voltage line 131 and the data lines 171a and 171b, so that a first portion of the passivation layer 180 having a first thickness H1, which may be relatively thick, may be disposed in a region where the spacer 325 is disposed. Since the spacer 325 is disposed on the passivation layer 180 having a relatively large first thickness H1, a desired cell gap may be maintained while the spacer 325 is formed to have a small height. As the spacer 325 reduces in thickness, the width of the spacer 325 may be reduced and thus the width of the light blocking member for covering the spacer may be narrowed. Accordingly, an aperture ratio of the liquid crystal display may be prevented from being reduced. A manufacturing method of a liquid crystal display will be described with reference to FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, and FIG. 36, along with FIG. 19, FIG. 20, FIG. 21, and FIG. 22. FIG. 23, FIG. 24, FIG. 25, and FIG. 26 are layout views showing some pixels according to a method of manufacturing the liquid crystal display. FIG. 24 is a cross-sectional view showing the liquid crystal display of FIG. 23 taken along line XXIV-XXIV. FIG. 25 is a cross-sectional view showing the liquid crystal display of FIG. 23 taken along line XXV-XXV. FIG. 27 is a cross-sectional view showing the liquid crystal display of FIG. 26 taken along line XXVII-XXVII. FIG. 28 is a cross-sectional view showing the liquid crystal display of FIG. 26 taken along line XVIII-XXVIII. FIG. 29, FIG. 31, FIG. 33, and FIG. 35 are cross-sectional views showing the liquid crystal display of FIG. 26 taken along line XXV-XXV according to a manufacturing process order. FIG. 30, FIG. 32, FIG. 34 and FIG. 36 are cross-sectional views showing the liquid crystal display of FIG. 26 taken along line XXVIII-XXVIII according to a manufacturing process order.

Referring to FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, and FIG. 36, the manufacturing method of a liquid crystal display may be similar to the manufacturing method of a liquid crystal display described with reference to FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18.

Referring to FIG. 23, FIG. 24, and FIG. 25, a first gate line 121a including a first gate electrode 124a, a second gate line 121b including a second gate electrode 124b and a pixel electrode 191 may be formed on a first insulation substrate 110. A gate insulating layer 140 may be disposed on the first gate line 121a, the second gate line 121b, and the pixel electrode 191.

A semiconductor layer, a semiconductor layer doped with impurity and a data conductive layer may be stacked and subjected to photolithography to form a first semiconductor 154a, a second semiconductor 154b, ohmic contacts 163 and 165, data lines 171a and 171b, drain electrodes 175a and 175b, and a common voltage line 131.

As shown in FIG. 26, FIG. 27, and FIG. 28, a passivation layer 180 including a first portion and a second portion having different heights may be formed on data conductors 171a, 171b, 175a, 175b, and 131 and the exposed semiconductors 154a and 154b using contact holes 183a, 183b, and 184.

A method of forming the passivation layer 180 will be described in more detail with reference to FIG. 29, FIG. 30, FIG. 31, FIG. 32, FIG. 33, FIG. 34, FIG. 35, and FIG. 36.

Figure 29:
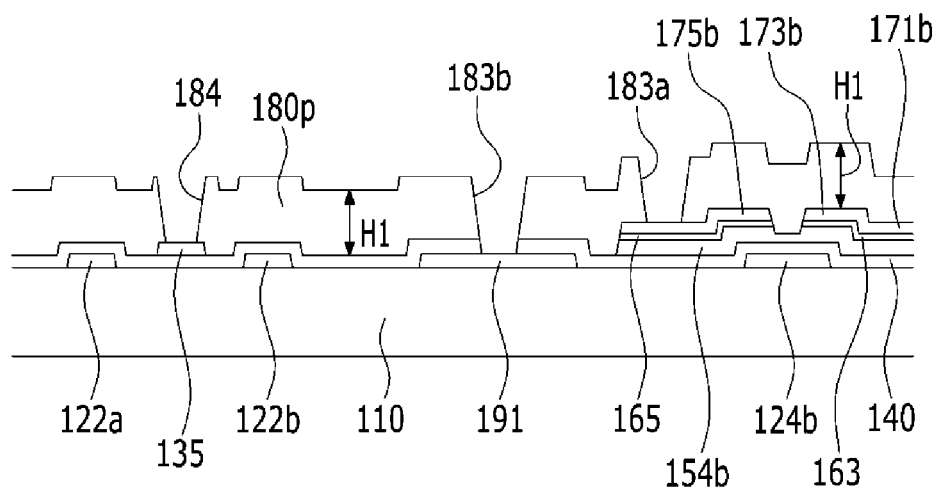
Figure 30:
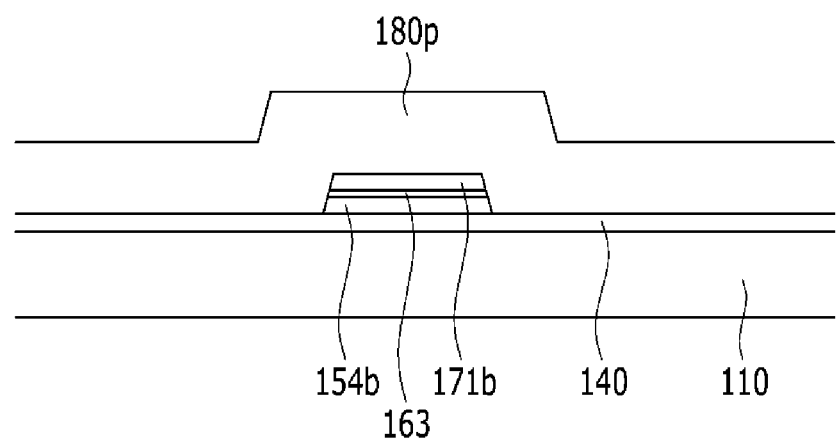

As shown in FIG. 29 and FIG. 30, the passivation layer 180 formed of an inorganic insulating material or an organic insulating material may be stacked on the data conductors 171a, 171b, 175a, 175b, and 131 and the exposed semiconductors 154a and 154b, and may be subjected to photolithography to form a first contact hole 183a. The passivation layer 180 and the gate insulating layer 140 may be etched together to form a second contact hole 183b and a third contact hole 184.

Figure 31:
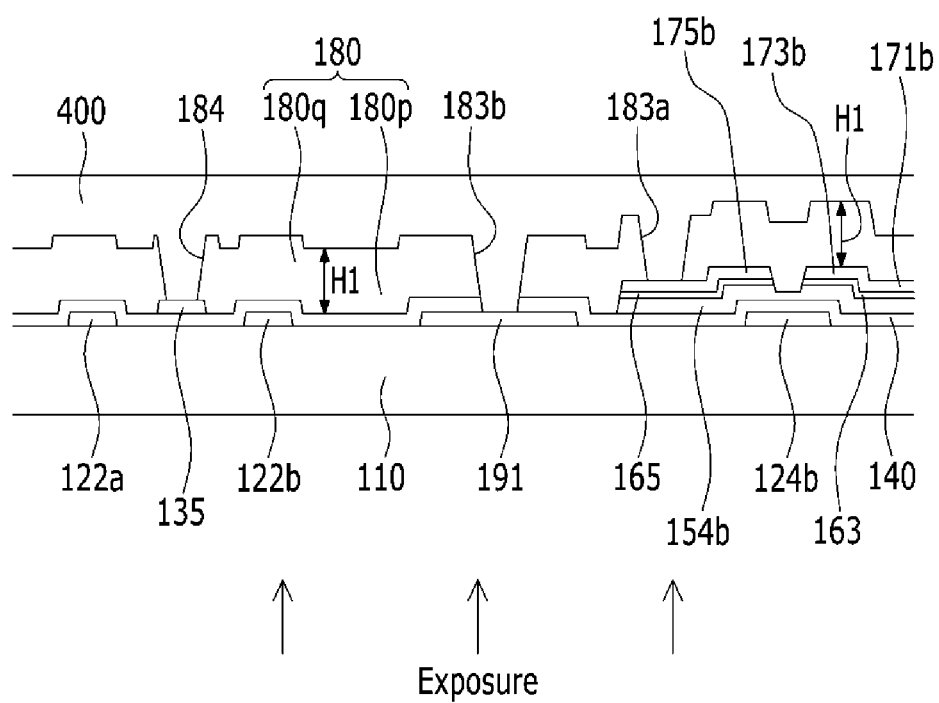
Figure 32:
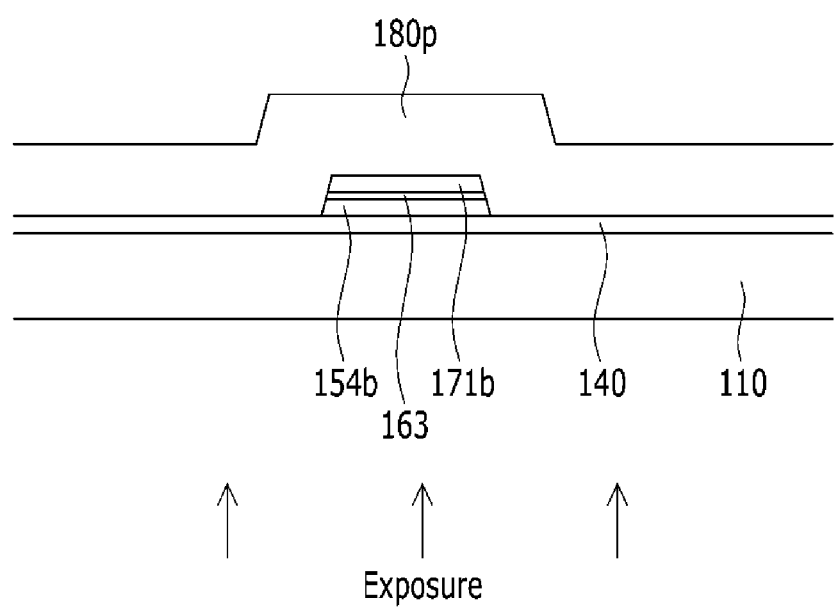
Figure 33:
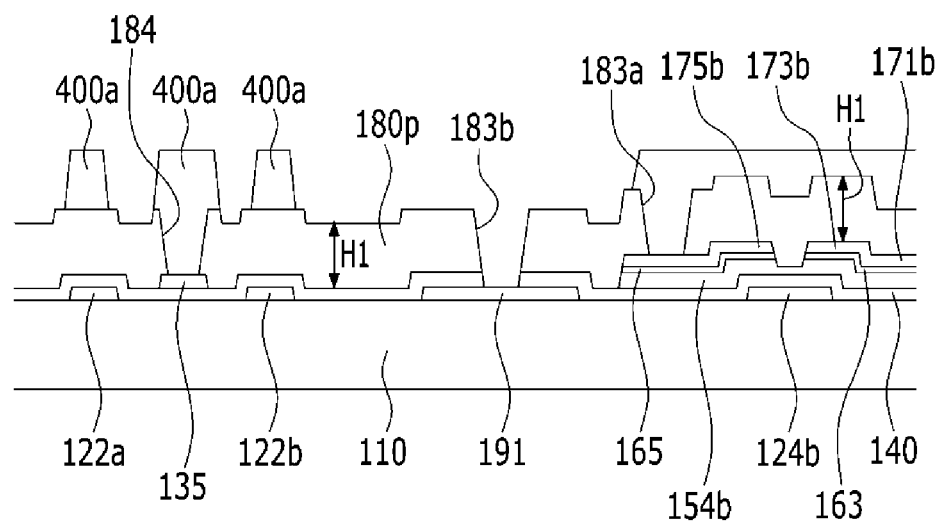
Figure 34:
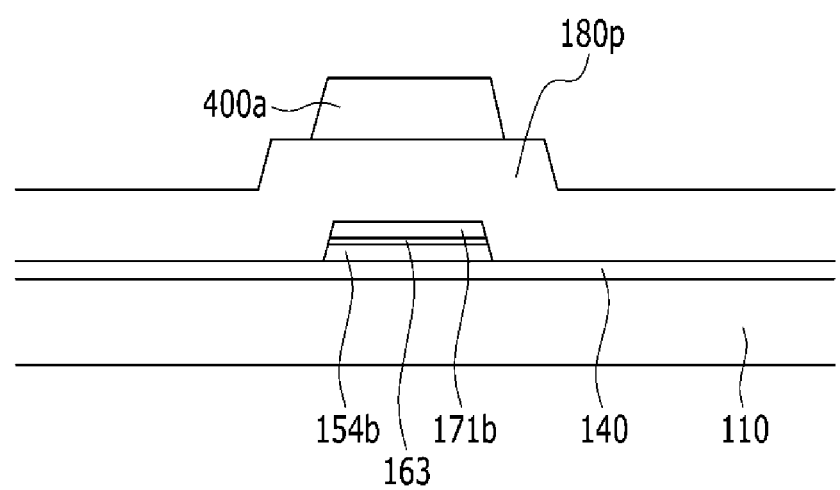

As shown in FIG. 31 and FIG. 32, a photosensitive film 400 may be stacked on the passivation layer 180, subjected to back exposure from a first insulation substrate 110 side, and printed to form a photosensitive film pattern 400a, as shown in FIG. 33 and FIG. 34. When the back exposure is performed from the first insulation substrate 110 side, signal lines, such as the gate lines 121a and 121b, the common voltage line 131 and the data lines 171a and 171b may serve as an exposure mask, so that light incident at the time of exposure does not pass through the signal lines such as the gate lines 121a and 121b, the common voltage line 131 and the data lines 171a and 171b, but passes through only the portions other than the signal lines. Therefore, the photosensitive film pattern 400a may be disposed only at a position overlapping the signal lines, such as the gate lines 121a and 121b, the common voltage line 131, and the data lines 171a and 171b.

Figure 35:
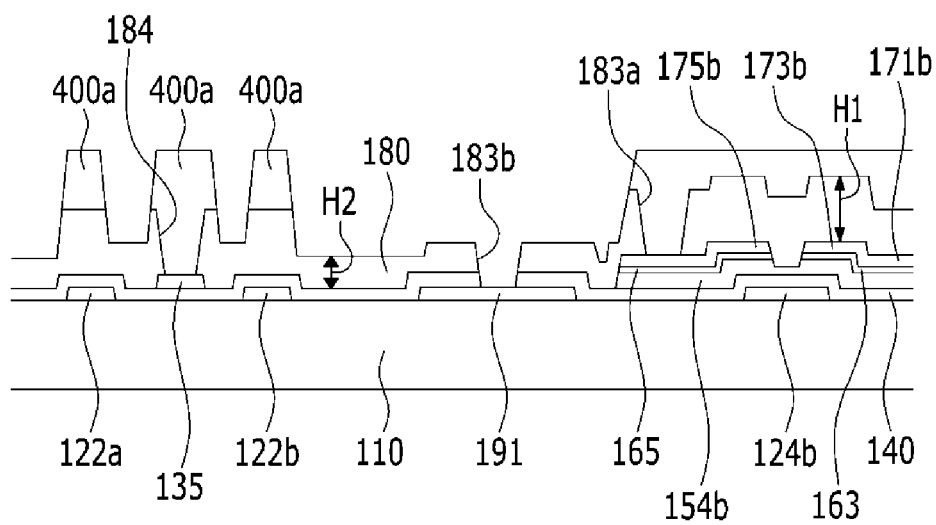
Figure 36:
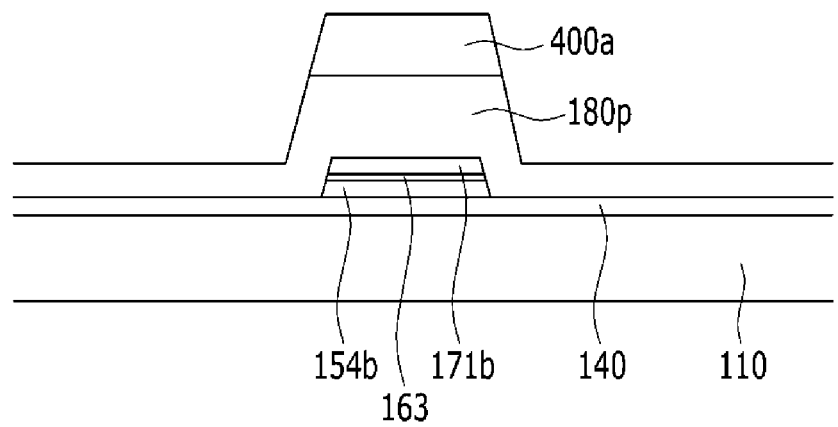

As shown in FIG. 35 and FIG. 36, the photosensitive film pattern 400a may be used as an etching mask to partially etch the passivation layer 180 not covered with the photosensitive film pattern 400a, so that the passivation layer 180, including the first portion having a first thickness H1, and the second portion having the second thickness H2 smaller than the first thickness H1 may be completed, and the photosensitive film pattern 400a may be removed.

Through the foregoing process, the first thickness H1 of the first portion of the passivation layer 180 disposed at positions overlapping signal lines, such as the gate lines 121a and 121b, the common voltage line 131, and the data lines 171a and 171b, may be larger than the second thickness H2 of the second portion of the passivation layer 180 disposed at portions not overlapping the signal lines. Accordingly, the height of the passivation layer 180 disposed at the position overlapping signal lines, such as the gate lines 121a and 121b, the common voltage line 131 and the data lines 171a and 171b, may be higher than the height of the passivation layer 180 disposed at positions not overlapping the signal lines such as the gate lines 121a and 121b, the common voltage line 131, and the data lines 171a and 171b.

A common electrode 270 and a connecting member 193 may be formed on the passivation layer 180, a light blocking member 220, and a color filter 230. An overcoat 250 may be formed on the second insulation substrate 210, and a spacer 325 may be formed on the first insulation substrate 110 or the second insulation substrate 210. The first insulation substrate 110 and the second insulation substrate 210 may be coupled to face each other and a liquid crystal layer 3 may be injected so that a liquid crystal display may be completed as shown in FIG. 19, FIG. 20, FIG. 21, and FIG. 22.

Many features of the manufacturing method of a liquid crystal display described with reference to FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18 are applicable to the manufacturing method of a liquid crystal display according to the exemplary embodiments of the present invention.

A liquid crystal display according to exemplary embodiments of the present invention will be described with reference to FIG. 37 and FIG. 38. FIG. 37 is a layout view showing some pixels of a liquid crystal display and FIG. 38 is a cross-sectional view showing the liquid crystal display of FIG. 37 taken along line XXXVIII-XXXVIII.

Referring to FIG. 37 and FIG. 38, the arrangement of signal lines of the liquid crystal display is similar to that of the liquid crystal display shown in FIG. 1, FIG. 2, FIG. 3 and FIG. 4, or the liquid crystal display shown in FIG. 19, FIG. 20, FIG. 21, and FIG. 22. However, positions of the pixel electrode 191 and the common electrode 270 of the liquid crystal display are different from those of the liquid crystal display shown in FIG. 1, FIG. 2, FIG. 3, and FIG. 4 and the liquid crystal display shown in FIG. 19, FIG. 20, FIG. 21, and FIG. 22.

Referring to FIG. 37 and FIG. 38, the liquid crystal display may include a lower panel 100 and an upper panel 200 facing each other, and a liquid crystal layer 3 interposed between two display panels 100 and 200.

Hereinafter, the lower panel 100 will be described.

A plurality of gate lines 121a and 121b may be formed on a first insulation substrate 110. The gate lines 121a and 121b may be disposed for each pixel row and may include a first gate line 121a disposed at an upper side along a pixel row and a second gate line 121b disposed at a lower side along the pixel row. The first gate line 121a may be disposed adjacent to a second gate line 121b disposed in an adjacent preceding pixel row. The second gate line 121b may be disposed adjacent to the first gate line 121a disposed in an adjacent subsequent pixel row. Accordingly, the first gate line 121a and the second gate line 121b disposed in the current pixel row may be paired with the second gate line 121b and the first gate line 121a disposed in the adjacent pixel rows so as to be disposed between the pixel rows.

The first gate line 121a may include a first gate electrode 124a, and the second gate line 121b may include a second gate electrode 124b. The first gate line 121a may include a first vertical portion 122a, and the second gate line 121b may include a second vertical portion 122b.

A gate insulating layer 140 may be formed on the gate lines 121a and 121b.

A first semiconductor 154a and a second semiconductor 154b may be formed on the gate insulating layer 140. A plurality of ohmic contacts 163 and 165 may be disposed on the semiconductors 154a and 154b.

Data conductors, including a plurality of data lines 171a and 171b, a plurality of drain electrodes 175a and 175b, and a plurality of common voltage lines 131, may be formed on the ohmic contacts 163 and 165.

The data lines 171a and 171b may transfer a data signal and may extend substantially in a vertical direction to cross the gate lines 121a and 121b.

The data lines 171a and 171b may include a first data line 171a and a second data line 171b between which two pixel electrodes 191 may be interposed.

The data lines 171a and 171b may be disposed one by one for every two pixel columns, and the data lines 171a and 171b may be alternately connected to pixel electrodes 191 of pixels disposed at left sides and right sides of the data lines 171a and 171b along a pixel column. Each of the data lines 171a and 171b may be connected to two pixel electrodes 191 disposed in two pixel columns along a pixel column to apply data voltage, thereby reducing the number of data lines 171a and 171b by half. The cost of the liquid crystal display may thus be reduced.

The first data line 171a may include a first source electrode 173a extending toward the first gate electrode 124a, and the second data line 171b may include a second source electrode 173b extending toward the second gate electrode 124b.

The first drain electrode 175a may include one end facing the first source electrode 173a with respect to the first gate electrode 124a and a second end having a large area.

The second drain electrode 175b may include one end facing the second source electrode 173b with respect to the second gate electrode 124b and a second end having a large area.

The common voltage line 131 may be disposed between two data lines 171a and 171b so as to extend in parallel with the data lines 171a and 171b. The common voltage line 131 may include a plurality of extension portions 135.

The extension portions 135 of the common voltage line 131 may be disposed between the vertical portions 122a and 122b of the first gate line 121a and the second gate line 121b.

Accordingly, the extension portions 135 of the common voltage line 131 may be disposed between the vertical portions 122a and 122b of the first gate line 121a and the second gate line 121b, thereby reducing an area of the gate lines 121a and 121b and the extension portions 135 of the common voltage line 131.

Some extension portions 135 among the plurality of extension portions 135 of the common voltage line 131 may overlap a contact hole 184. Some extension portions 135 among the plurality of extension portions 135 may overlap a spacer 325.

A lower passivation layer 180a may be disposed on the data conductor 171a, 171b, 175a, 175b, and 131 and the exposed semiconductors 154a and 154b.

The lower passivation layer 180a may include a third portion having a third thickness H3, which may be relatively thick, and a fourth portion having a fourth thickness H4, which may be relatively thin. The third portion of the lower passivation layer 180a may be disposed at a portion overlapping signal lines, such as the gate lines 121a and 121b, the common voltage line 131, and the data lines 171a and 171b. A height of the lower passivation layer 180a disposed on the position overlapping signal lines, such as the gate lines 121a and 121b, the common voltage line 131, and the data lines 171a and 171b may be higher than a height of the lower passivation layer 180a disposed at a position not overlapping the signal lines, such as the gate lines 121a and 121b, the common voltage line 131, and the data lines 171a and 171b.

The lower passivation layer 180a may be formed of a single layer, and may include the third portion and the fourth portion having different thicknesses. A lower passivation layer 180a of a liquid crystal display may include a third passivation layer having a fourth thickness H4 and a fourth passivation layer may be disposed on a part of the third passivation layer. A thickness of the passivation layer 180 at the third portion, where the third passivation layer overlaps the fourth passivation layer, may be the third thickness H3, which may be larger than a thickness of the third passivation layer. The fourth passivation layer may be disposed only at the position overlapping signal lines, such as the gate lines 121a and 121b, the common voltage line 131, and the data lines 171a and 171b.

A common electrode 270 may be formed on the lower passivation layer 180a. The common electrode 270 may have a plate shape, and common electrodes 270 disposed in adjacent pixel areas may be connected to each other. The common electrode 270 may have an aperture region 185 formed on the drain electrodes 175a and 175b.

An upper passivation layer 180b may be disposed on the common electrode 270.

A pixel electrode 191 may be formed on the upper passivation layer 180b. The pixel electrode 191 may include a plurality of branch electrodes 192.

A third contact hole 184 exposing the extension portions 135 of the common voltage line 131 may be formed in the lower passivation layer 180a.

The common electrode 270 may be connected to the extension portions 135 of the common voltage line 131 through the third contact hole 184.

A fifth contact hole 186 may be formed in the lower passivation layer 180a and the upper passivation layer 180b.

The fifth contact hole 186 may be formed in the aperture region 185 of the common electrode 270.

The pixel electrode 191 may come in contact with the drain electrodes 175a and 175b through the fifth contact hole 186 formed in the lower passivation layer 180a and the upper passivation layer 180b.

The pixel electrode 191 receiving data voltage may generate an electric field in the liquid crystal layer 3 along with the common electrode 270 receiving the common voltage.

According to the present exemplary embodiments of the invention, the lower passivation layer 180a may include a third portion disposed at a position overlapping signal lines, such as the gate lines 121a and 121b, the common voltage line 131, and the data lines 171a and 171b and a fourth portion disposed at positions not overlapping the signal lines, such as the gate lines 121a and 121b, the common voltage line 131, and the data lines 171a and 171b. Accordingly, a third thickness H3 of the third portion of the lower passivation layer 180 disposed between the data lines 171a and 171b and the common electrode 270 disposed thereon is larger than a fourth thickness H4 of the fourth portion of the lower passivation layer 180a disposed at the portions other than between the data lines 171a and 171b. Accordingly, a signal delay of the common voltage applied to the common electrode 270, which may occur due to electromagnetic interference of the data voltage applied to the signal lines such as the data lines 171a and 171b, may be prevented.

The lower passivation layer 180a, which may be disposed in an aperture region where the pixel electrode 191 overlaps the common electrode 270, may have a relatively small fourth thickness H4. Therefore, in the aperture region of the liquid crystal display, the intensity of the electric field between the common electrode 270 and the pixel electrode 191 may be prevented from being reduced. Accordingly, a signal delay of the common voltage of the common electrode 270 along the signal lines such as the data lines 171a and 171b may be prevented.

Hereinafter, the upper panel 200 will be described. A light blocking member 220 may be formed on the second insulation substrate 210. A plurality of color filters 230 may be formed on the second substrate 210. Most of the color filters 230 may be present in a region surrounded by the light blocking member 220.

An overcoat 250 may be formed on the color filter 230 and the light blocking member 220. The overcoat 250 may be omitted.

Although not shown, a spacer may be disposed between the lower panel 100 and the upper panel 200. The spacer 325 may be disposed at a position overlapping signal lines such as the gate lines 121a and 121b, the common voltage line 131 and the data lines 171a and 171b. Since the spacer may be disposed on the lower passivation layer 180a having a relatively large third thickness H1, a desired cell gap may be maintained while the spacer is formed to have a small height. As the spacer's thickness reduces, the width of the spacer may reduce and thus the width of the light blocking member for covering the spacer may be narrowed. Accordingly, an aperture ratio of the liquid crystal display may be prevented from being reduced.

Features described above with reference to the figures are applicable to exemplary embodiments of the liquid crystal display.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a first field generating electrode and a second field generating electrode disposed on the first substrate, the first field generating electrode overlapping the second field generating electrode;
an insulating layer disposed between the first field generating electrode and the second field generating electrode;
a first signal line and a second signal line disposed on the first substrate, the first signal line and the second signal line being connected to the first field generating electrode; and
a gate insulating layer disposed between the first signal line and the second signal line,
wherein:
the insulating layer comprises a passivation layer disposed between the second signal line and the second field generating electrode;
the passivation layer comprises a first portion overlapping the first signal line and the second signal line and a second portion not overlapping the first signal line and the second signal line;
a thickness of the first portion is larger than a thickness of the second portion; and
the first field generating electrode is disposed between the first substrate and the gate insulating layer.

2. The liquid crystal display of claim 1, wherein:
the first portion of the passivation layer comprises a first passivation layer and a second passivation layer disposed on the first passivation layer, and
the second portion of the passivation layer comprises the first passivation layer.

3. The liquid crystal display of claim 2, wherein:
the first passivation layer and the second passivation layer have different etching rates.

4. The liquid crystal display of claim 3, further comprising:
a second substrate facing the first substrate; and
a spacer disposed between the first substrate and the second substrate,
wherein the spacer overlaps the first portion of the passivation layer.

5. The liquid crystal display of claim 1, further comprising:
a second substrate facing the first substrate; and
a spacer disposed between the first substrate and the second substrate,
wherein the spacer overlaps the first portion of the passivation layer.

* * * * *